(12) United States Patent
Xiao et al.

(10) Patent No.: US 12,035,343 B2
(45) Date of Patent: Jul. 9, 2024

(54) DATA SCHEDULING METHOD AND APPARATUS

(71) Applicant: Huawei Technologies Co., Ltd., Shenzhen (CN)

(72) Inventors: Jiehua Xiao, Shenzhen (CN); Jinlin Peng, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 689 days.

(21) Appl. No.: 17/171,469

(22) Filed: Feb. 9, 2021

(65) Prior Publication Data

US 2021/0168835 A1 Jun. 3, 2021

Related U.S. Application Data

(63) Continuation of application No. PCT/CN2019/099440, filed on Aug. 6, 2019.

(30) Foreign Application Priority Data

Aug. 10, 2018 (CN) .......................... 201810911049.0

(51) Int. Cl.
*H04W 72/50* (2023.01)
*H04W 8/24* (2009.01)
(Continued)

(52) U.S. Cl.
CPC .......... *H04W 72/535* (2023.01); *H04W 8/24* (2013.01); *H04W 72/0446* (2013.01); *H04W 72/0453* (2013.01); *H04W 72/1273* (2013.01)

(58) Field of Classification Search
None
See application file for complete search history.

(56) References Cited

U.S. PATENT DOCUMENTS

| 9,948,443 | B2 | 4/2018 | Kusashima et al. |
| 10,897,761 | B2 | 1/2021 | Gao et al. |

(Continued)

FOREIGN PATENT DOCUMENTS

| CN | 105393624 A | 3/2016 |
| CN | 105589506 A | 5/2016 |

(Continued)

OTHER PUBLICATIONS

3GPP TS 38.214 V15.2.0 (Jun. 2018), 3rd Generation Partnership Project; Technical Specification Group Radio Access Network; NR; Physical layer procedures for data (Release 15),95 pages.

(Continued)

*Primary Examiner* — Adnan Baig
(74) *Attorney, Agent, or Firm* — Slater Matsil, LLP

(57) ABSTRACT

This application relates to the field of communications technologies, and discloses a data scheduling method and an apparatus. The data scheduling method includes: sending, by a network device at a first time domain position, scheduling information to a terminal device, and sending or receiving, at a second time domain position, data scheduled by using the scheduling information, where the first time domain position and the second time domain position are located on different carriers, or the first time domain position and the second time domain position are located on different BWPs. The second time domain position may be determined based on an end position of the first time domain position and/or a capability of the terminal device.

12 Claims, 28 Drawing Sheets

(51) Int. Cl.
*H04W 72/0446* (2023.01)
*H04W 72/0453* (2023.01)
*H04W 72/1273* (2023.01)

(56) References Cited

U.S. PATENT DOCUMENTS

| | | |
|---|---|---|
| 10,945,252 B2 | 3/2021 | Park |
| 2014/0071862 A1 | 3/2014 | Ji et al. |
| 2017/0026164 A1 | 1/2017 | Damnjanovic et al. |
| 2018/0124687 A1 | 5/2018 | Park et al. |
| 2018/0131482 A1 | 5/2018 | Zhou et al. |
| 2018/0175975 A1 | 6/2018 | Um et al. |
| 2018/0219654 A1 | 8/2018 | Chen et al. |
| 2020/0077432 A1* | 3/2020 | Xiong .................. H04L 1/1812 |
| 2020/0128578 A1* | 4/2020 | Park ..................... H04L 1/1812 |
| 2021/0112563 A1 | 4/2021 | Hua et al. |

FOREIGN PATENT DOCUMENTS

| | | |
|---|---|---|
| CN | 105592467 A | 5/2016 |
| CN | 106304372 A | 1/2017 |
| CN | 106559188 A | 4/2017 |
| CN | 107370683 A | 11/2017 |
| CN | 110636616 A | 12/2019 |
| EP | 2498435 A2 | 9/2012 |
| EP | 3468084 A1 | 4/2019 |
| KR | 20170134255 A | 12/2017 |
| WO | 2017113405 A1 | 7/2017 |

OTHER PUBLICATIONS

MediaTek Inc., "Remaining issues of DLUL scheduling and HARQ management", R1-1806801, 3GPP TSG RAN WG1 Meeting #93, May 21-25, 2018, 9 pages, Busan, Korea.

Nokia, Nokia Shanghai Bell, "On resource allocation for POSCH and PUSCH in NR", 3GPP TSG RAN WG1 Meeting 90bis, R1-1718620, Oct. 9-13, 2017, 10 pages, Prague, CZ.

MediaTek Inc., "Remaining issues in carrier aggregation", 3GPP TSG RAN WG1 Meeting #93, R1-1806776, May 21-25, 2018, 12 pages, Busan, Korea.

Ericsson, "On PUCCH Resource Allocation", 3GPP TSG RAN WG1 Meeting#90bis, R1-1718639, Oct. 9-13, 2017, 8 pages, Prague, Czech Republic.

* cited by examiner

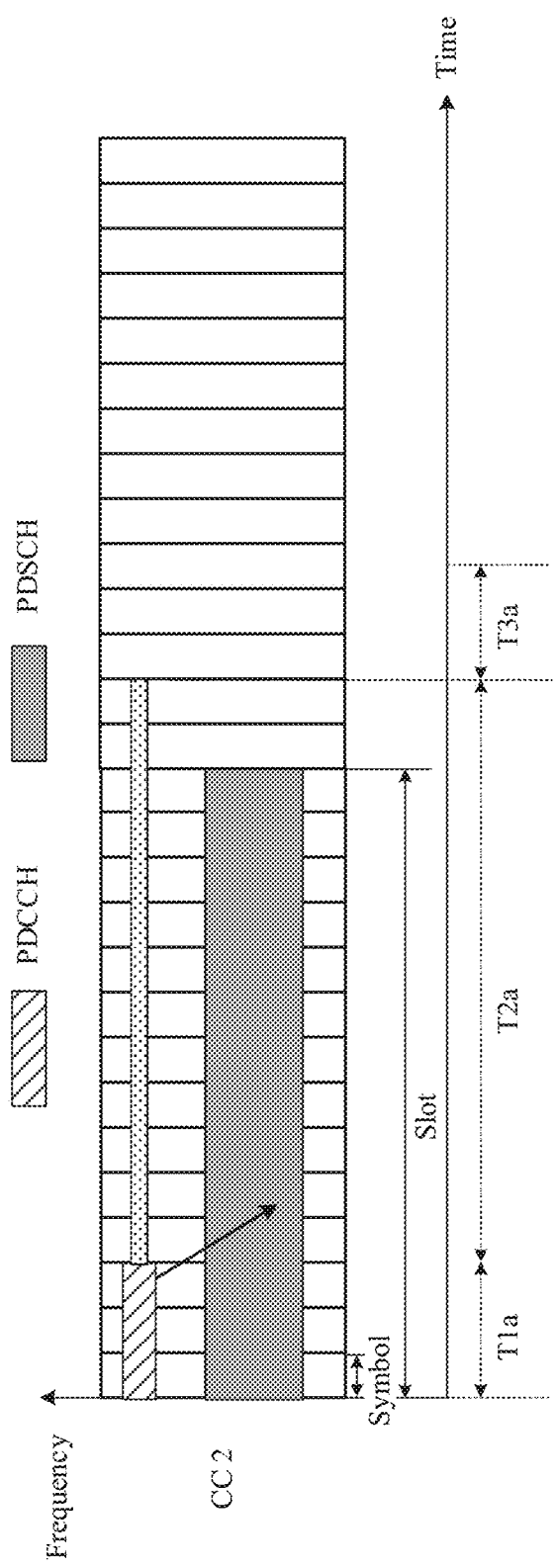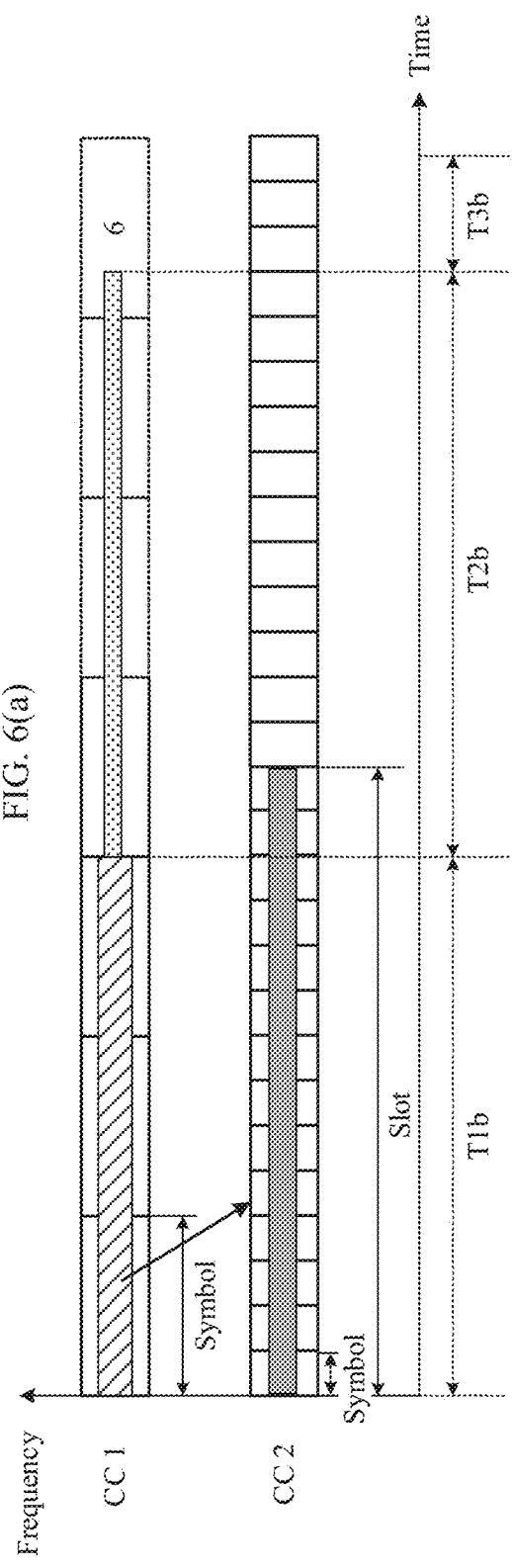
FIG. 6(a)
FIG. 6(b)

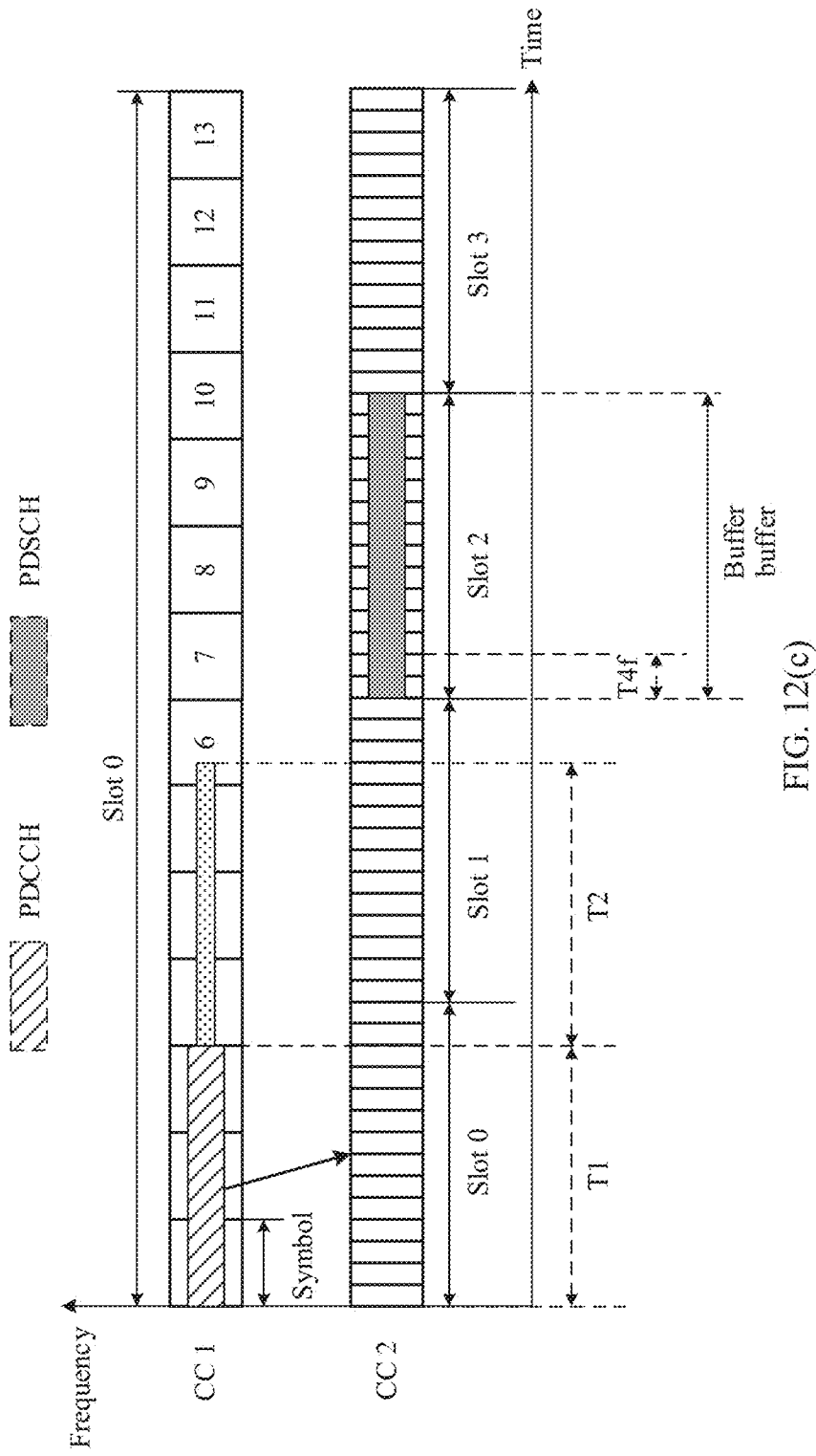

DATA SCHEDULING METHOD AND APPARATUS

CROSS-REFERENCE TO RELATED APPLICATIONS

This application is a continuation of International Application No. PCT/CN2019/099440, filed on Aug. 6, 2019, which claims priority to Chinese Patent Application No. 201810911049.0, filed on Aug. 10, 2018. The disclosures of the aforementioned applications are hereby incorporated by reference in their entireties.

TECHNICAL FIELD

This application relates to the field of communications technologies, and in particular, to a data scheduling method and an apparatus.

BACKGROUND

In a wireless communications system, as a quantity of intelligent terminal users is increasing, a user service volume and a data throughput are also increasing, and further, a higher requirement is imposed on a communication bandwidth and a communication rate. Therefore, a carrier aggregation (CA) technology is introduced. An aggregated carrier includes a plurality of CCs (component carriers), and the plurality of CCs include one primary carrier (PC for short) and one or more secondary carriers (SC for short). A plurality of consecutive or non-consecutive component carriers may be aggregated for use through carrier aggregation. In addition, a $5^{th}$ generation mobile communication technology new radio (5G NR) system further defines another frequency resource, for example, a bandwidth part (BWP), to meet a requirement for flexible bandwidth use in mobile communication, and improve utilization of scattered spectrums in a radio frequency band.

A carrier aggregation technology of a long term evolution (LTE) system may support cross-carrier scheduling. The cross-carrier scheduling refers to scheduling data channel resources of another component carrier on one component carrier. The 5G system needs to support more services and richer spectrum resources. Therefore, the 5G system continues using carrier aggregation and cross-carrier scheduling technologies. In addition, the 5G system will also support cross-BWP scheduling and feedback due to the introduction of the BWP. However, in the LTE system, a subcarrier spacing is fixed. In the 5G system, considering that a radio propagation characteristic of a high frequency band is greatly different from a radio propagation characteristic of a low frequency band, subcarrier spacings on different frequency bands may be different. For example, a subcarrier spacing on a low frequency band is 15 kHz, and a subcarrier spacing on a high frequency band is 60 kHz. Even in a same frequency band, subcarrier spacings on different carriers may be different. Subcarrier spacings on different BWPs of a same carrier may also be different.

In the 5G system, a subcarrier spacing is no longer fixed. When subcarrier spacings of a scheduling carrier and a scheduled carrier are different, how to perform cross-carrier scheduling still needs to be further studied.

SUMMARY

In view of this, this application provides a data scheduling method and an apparatus, to limit a time domain position of data scheduled by using scheduling information, so as to avoid a case in which a terminal device stores data before demodulation (or to-be-sent data) for a relatively long time, and a load of the terminal device is increased.

According to a first aspect, an embodiment of this application provides a data scheduling method. The method includes:

A network device sends, at a first time domain position, scheduling information to a terminal device, and sends or receives, at a second time domain position, data scheduled by using the scheduling information. The first time domain position and the second time domain position are located on different carriers, or the first time domain position and the second time domain position are located on different bandwidth parts BWPs. The second time domain position is determined based on an end position of the first time domain position and/or a capability of the terminal device.

In other words, when the network device schedules data by using the scheduling information, the scheduled data may be located at a plurality of possible time domain positions. However, when the scheduled data is located at some possible time domain positions, duration for buffering data by the terminal device is relatively long (which may exceed a buffer size of the terminal device), and then, a processing load of the terminal device is increased. Therefore, in this embodiment of this application, it is proposed that a time domain position of the scheduled data is determined based on the capability of the terminal device and/or the end position of the time domain position of the scheduling information, so that duration for storing data before demodulation (or to-be-sent data) by the terminal device by limiting the time domain position of the scheduled data is effectively shortened, thereby reducing the processing load of the terminal device.

Based on the first aspect, in a possible implementation, the capability of the terminal device includes any one or more of the following: a buffer size of the terminal device and a processing capability of the terminal device. The processing capability of the terminal device includes any one or more of the following: a capability of processing scheduling information and a capability of processing data. In another possible embodiment, the capability of the terminal device may further include other information. This is not limited in this embodiment of this application.

Based on the first aspect, in a possible implementation, the method further includes: The network device receives the buffer size of the terminal device reported by the terminal device; or the network device obtains the processing capability of the terminal device, and determines the buffer size of the terminal device based on the processing capability of the terminal device.

According to a second aspect, an embodiment of this application provides a data scheduling method. The method includes:

A terminal device receives, at a first time domain position, scheduling information sent by a network device, and receives or sends, at a second time domain position, data scheduled by using the scheduling information. The first time domain position and the second time domain position are located on different carriers, or the first time domain position and the second time domain position are located on different bandwidth parts BWPs. The second time domain position is determined based on an end position of the first time domain position and/or a capability of the terminal device.

Therefore, duration for storing data before demodulation (or to-be-sent data) by the terminal device is effectively shortened by limiting a time domain position of the scheduled data, thereby reducing a processing load of the terminal device.

Based on the second aspect, in a possible implementation, the capability of the terminal device includes any one or more of the following: a buffer size of the terminal device and a processing capability of the terminal device. The processing capability of the terminal device includes any one or more of the following: a capability of processing scheduling information and a capability of processing data.

Based on the second aspect, in a possible implementation, the method further includes: The terminal device reports the buffer size of the terminal device and/or the processing capability of the terminal device to the network device.

Based on the first aspect or the second aspect, in a possible implementation, the first time domain position and the second time domain position do not overlap on time domain resources.

Based on the first aspect or the second aspect, in a possible implementation, the first time domain position is located in a first slot in the scheduling resource, and a last symbol, in the first slot, occupied by the first time domain position is located in a second slot in the scheduled resource; the second time domain position is located in any slot after the second slot in the scheduled resource; and the scheduling resource and the scheduled resource are located on the different carriers, or the scheduling resource and the scheduled resource are located on the different BWPs.

Based on the first aspect or the second aspect, in a possible implementation, the first time domain position is located in a first slot in the scheduling resource, and a last symbol, in the first slot, occupied by the first time domain position is located in a second slot in the scheduled resource; the second time domain position is located in the second slot, and a symbol, in the second slot, occupied by the second time domain position is located after the last symbol, in the first slot, occupied by the first time domain position; and the scheduling resource and the scheduled resource are located on the different carriers, or the scheduling resource and the scheduled resource are located on the different BWPs.

Based on the first aspect or the second aspect, in a possible implementation, a start symbol, in the second slot, occupied by the second time domain position is determined based on the last symbol, in the first slot, occupied by the first time domain position; and a quantity of symbols, in the second time domain unit, occupied by the second time domain position is determined based on a quantity of symbols included in the second time domain unit and the start symbol, in the second time domain unit, occupied by the second time domain position.

Based on the first aspect or the second aspect, in a possible implementation, duration of a data volume that can be stored in a buffer of the terminal device on the scheduled resource is less than duration from a start point of the first time domain position to a time point at which the terminal device completes channel estimation on the data channel.

According to a third aspect, an embodiment of this application provides an apparatus. The apparatus may be a network device or a terminal device, or may be a semiconductor chip disposed in a network device or a terminal device. The apparatus has a function of implementing various possible implementations of the first aspect and the second aspect. The function may be implemented by hardware, or may be implemented by hardware executing corresponding software. The hardware or software includes one or more units or modules corresponding to the foregoing functions.

According to a fourth aspect, an embodiment of this application provides an apparatus, including a processor and a memory. The memory is configured to store a computer-executable instruction. When the apparatus runs, the processor executes the computer-executable instruction stored in the memory, to enable the apparatus to perform the data scheduling method according to any one of the first aspect or the possible implementations of the first aspect, or to enable the apparatus to perform the data scheduling method according to any one of the second aspect or the possible implementations of the second aspect.

According to a fifth aspect, an embodiment of this application further provides a computer-readable storage medium. The computer-readable storage medium stores an instruction. When the instruction is run on a computer, the computer is enabled to perform the method according to the foregoing aspects.

According to a sixth aspect, an embodiment of this application further provides a computer program product including an instruction. When the computer program product runs on a computer, the computer is enabled to perform the methods according to the foregoing aspects.

These aspects or other aspects of this application are clearer and comprehensible in descriptions of the following embodiments.

BRIEF DESCRIPTION OF THE DRAWINGS

FIG. 6(a) and FIG. 6(b) are respectively schematic diagrams of self-carrier data scheduling and cross-carrier data scheduling;

FIG. 12(a), FIG. 12(b) and FIG. 12(c) are a schematic diagram of another case in which whether to limit a second time domain position is determined based on a capability of a terminal device;

DETAILED DESCRIPTION OF ILLUSTRATIVE EMBODIMENTS

Figure 1:
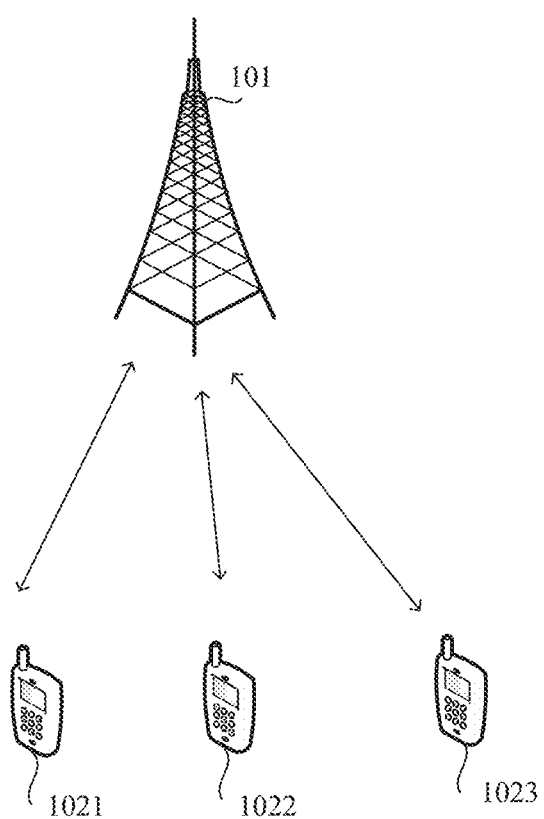
FIG. 1 is a schematic diagram of a system architecture to which an embodiment of this application is applicable.

To make the objectives, technical solutions, and advantages of this application clearer, the following further describes this application in detail with reference to the accompanying drawings. In descriptions of this application, a person of ordinary skill in the art may understand that various reference numerals such as "first" and "second" in this application are merely used for differentiation for ease of description, and are not used to limit the scope of the embodiments of this application, or represent a sequence. The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. "At least one" means one or more. "At least two" means two or more. "At least one", "any one", or a similar expression thereof means any combination of these items, including a singular item (piece) or any combination of plural items (pieces). For example, at least one (piece, or type) of a, b, or c may indicate: a, b, c, a-b, a-c, b-c, or a-b-c, where a, b, and c may be singular or plural.

The following clearly describes the technical solutions in the embodiments of this application with reference to the accompanying drawings in the embodiments of this application.

FIG. 1 is a schematic diagram of a system architecture to which an embodiment of this application is applicable. As shown in FIG. 1, the system architecture includes a network device 101 and one or more terminal devices, for example, a first terminal 1021, a second terminal 1022, and a third terminal 1023 that are shown in FIG. 1. The network device 101 may communicate with any one of the first terminal 1021, the second terminal 1022, and the third terminal 1023 through a network.

In this embodiment of this application, the network device may be a base station (BS), and is an apparatus that is deployed in a radio access network to provide a wireless communication function. For example, a device that provides a base station function in a 2G network includes a base transceiver station (BTS) and a base station controller (BSC); a device that provides a base station function in a 3G network includes a NodeB and a radio network controller (RNC); a device that provides a base station function in a 4G network includes an evolved NodeB (eNB); and a device that provides a base station function in a 5G network includes a new radio NodeB (gNB), a centralized unit (CU), a distributed unit, and a new radio controller.

The terminal device is a device having a wireless transceiver function, and may be deployed on land, where the deployment includes indoor or outdoor, handheld, wearable, or vehicle-mounted deployment; may be deployed on water (for example, on a ship); or may be deployed in air (for example, on an airplane, a balloon, and a satellite). The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in this embodiment of this application. The terminal device may sometimes be referred to as user equipment (UE), an access terminal device, a UE unit, a UE station, a mobile station, a mobile console, a remote station, a remote terminal device, a mobile device, a UE terminal device, a terminal device, a wireless communications device, a UE agent, a UE apparatus, or the like.

The system architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that: With evolution of the communications system architecture and emergence of new service scenarios, the technical solutions provided in the embodiments of this application are also applicable to similar technical problems.

In the system architecture shown in FIG. 1, the network device may send scheduling information to the terminal device by using a scheduling resource, and send data to or receive data from the terminal device by using a scheduled resource. Specifically, the scheduling information may be located on a physical downlink control channel (PDCCH). The scheduling information may be downlink control information (DCI) carried on the PDCCH or may be an information field in DCI. The scheduling information is used to indicate a data channel of the scheduled resource. Correspondingly, the terminal device may receive the scheduling information by using the scheduling resource, and receive or send, by using the scheduled resource based on information carried in the scheduling information, data scheduled by using the scheduling information. The data may be located on the data channel, and the data channel may include a physical downlink shared channel (PDSCH) (used to carry downlink data) and/or a physical uplink shared channel (PUSCH) (used to carry uplink data). In the following embodiment, that the data channel is the PDSCH is used as an example for description.

A type of a resource is not limited in this embodiment of this application. For example, the resource may be a carrier or a BWP. In an example, the scheduling resource may be a time-frequency resource in the carrier, or may be a time-frequency resource in the BWP. The scheduled resource may be a time-frequency resource in the carrier, or may be a time-frequency resource in the BWP. For ease of description, the scheduling resource may be referred to as a scheduling carrier, and the scheduled resource may be referred to as a scheduled carrier. In the following embodiment, the scheduling carrier and the scheduled carrier are used as an example for description. It should be understood that a principle of this embodiment of this application may be applicable to a case of another resource scheduling granularity.

In an example, a CC 1 represents the scheduling carrier, and a CC 2 represents the scheduled carrier. The network device sends DCI to the terminal device through a PDCCH of the CC 1. The DCI includes indication information of a PDSCH resource on the CC 2. The indication information indicates a location of a PDSCH time-frequency resource that is on the CC 2 and that is allocated to the terminal device for use, so that the terminal device can receive, on the indicated CC 2, the data sent by the network device. In another example, the CC 1 represents the scheduling carrier, and the CC 2 represents the scheduled carrier. The network device sends the DCI to the terminal device through the PDCCH of the CC 1. The DCI includes indication information of a PUSCH resource on the CC 2. The indication information indicates a location of a PUSCH time-frequency resource that is on the CC 2 and that is allocated to the terminal device for use, so that the terminal device can send, on an indicated PUSCH on the CC 2, the data to the network device.

Figure 2:
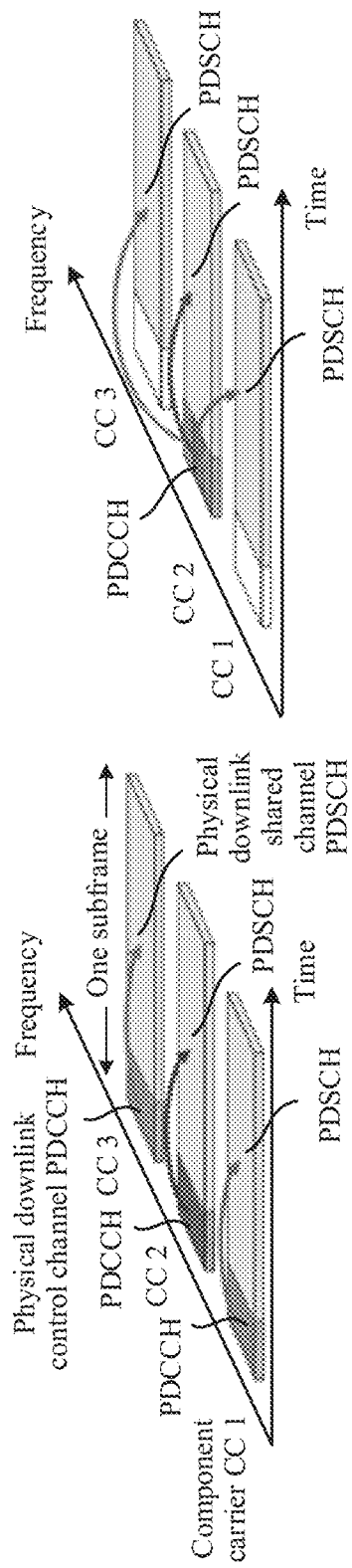
FIG. 2 is a schematic diagram of self-carrier scheduling and cross-carrier scheduling.

The scheduling carrier and the scheduled carrier may be same carriers (self-carrier scheduling), or may be different carriers (cross-carrier scheduling). For example, as shown in FIG. 2, a schematic diagram of a case in which cross-carrier scheduling is not used (in other words, the scheduling carrier and the scheduled carrier are same carriers) is shown on the left of FIG. 2, and a schematic diagram of a case in which cross-carrier scheduling is used (in other words, the scheduling carrier and the scheduled carrier are different carriers) is shown on the right of FIG. 2. It can be learned that, when cross-carrier scheduling is used, a PDCCH on one carrier may indicate a PDSCH resource on another carrier. In this embodiment of this application, a cross-carrier scheduling case is mainly studied.

Figure 3:
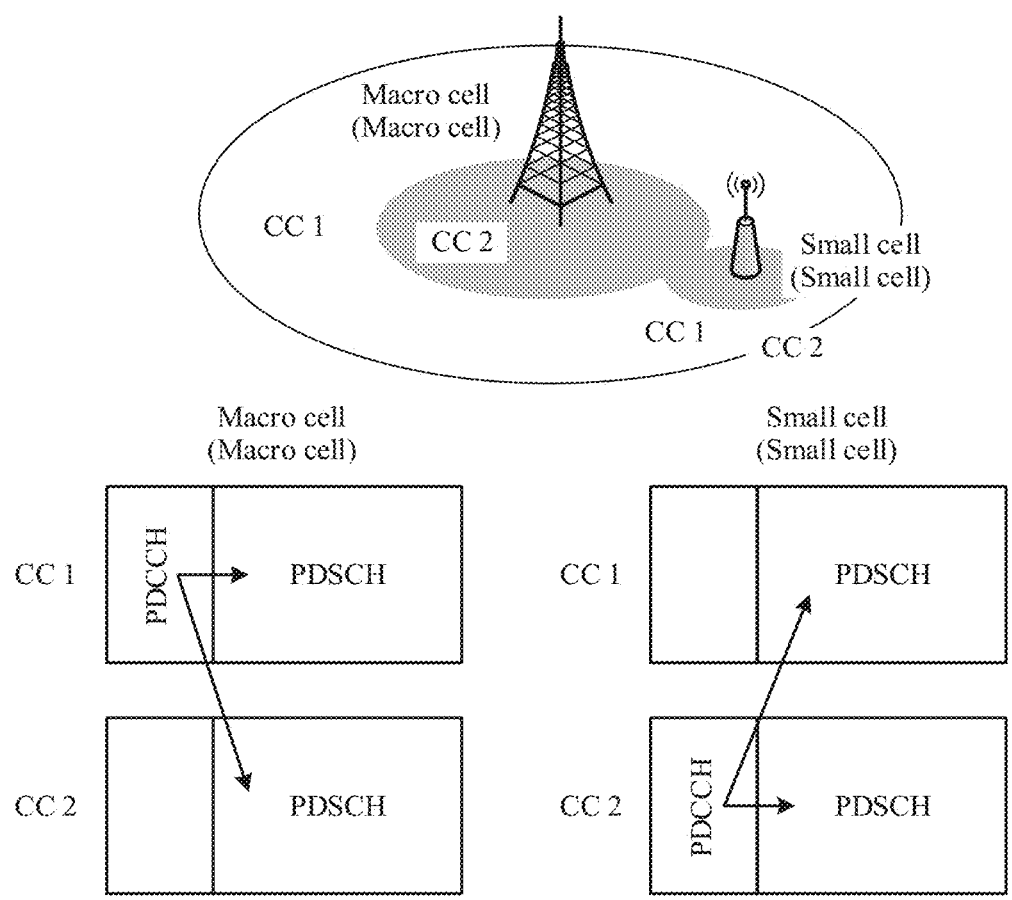
FIG. 3 is a schematic diagram of a cross-carrier scheduling scenario.

In an example of cross-carrier scheduling shown in FIG. 3, a macro cell (corresponding to the macro cell in the figure) and a small cell (corresponding to the small cell in the figure) share two downlink component carriers: a CC 1 and a CC 2. Two component carriers of the small cell work at a low transmission power, the CC 1 of the macro cell works at a high transmission power, and the CC 2 works at a low transmission power. Therefore, in the small cell, a PDCCH on the CC 2 is used to schedule a PDSCH resource on the CC 1 in a cross-carrier manner. In the macro cell, a PDCCH on the CC 1 is used to schedule a PDSCH resource on the CC 2 in a cross-carrier manner.

In a cross-carrier scheduling scenario, a frame structure parameter (numerology) of a scheduling carrier may be the same as or different from a frame structure parameter of a scheduled carrier. The frame structure parameter may include a subcarrier spacing and a cyclic prefix (CP), and the subcarrier spacing (SCS) may also be referred to as a subcarrier bandwidth. Different frame structure parameters have different index values μ. Table 1 shows a correspondence between an index value of a frame structure parameter and the frame structure parameter.

TABLE 1

Correspondence between an index value of a frame structure parameter and the frame structure parameter

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, extended |
| 3 | 120 | Normal |
| 4 | 240 | Normal |

Figure 4A:
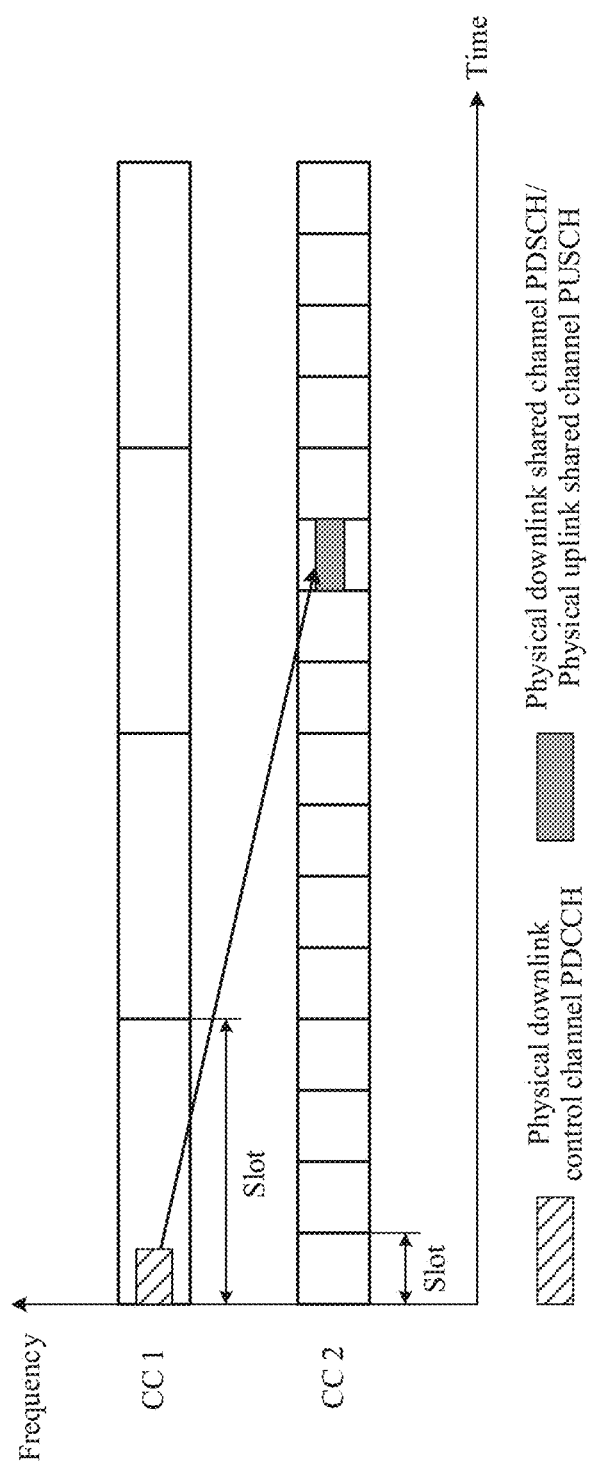
FIG. 4A and FIG. 4B are respectively schematic diagrams of different subcarrier spacings of a scheduled carrier and a scheduled carrier in cross-carrier scheduling.
Figure 4B:
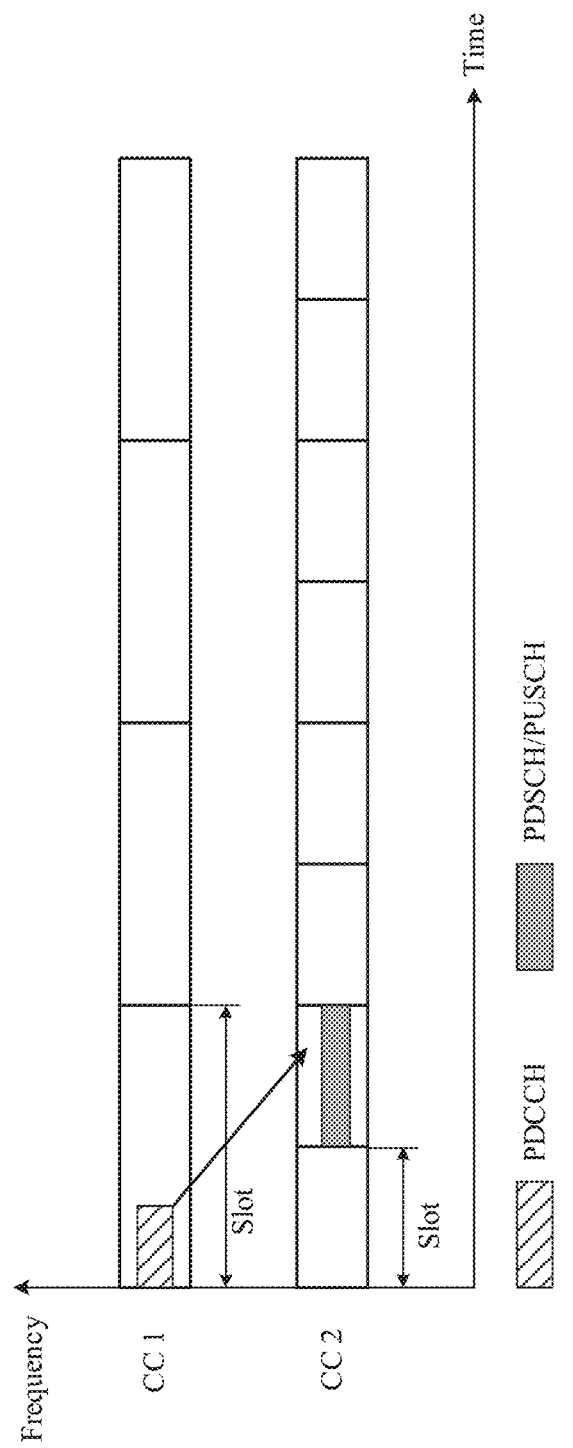

In other words, the subcarrier spacing of the scheduling carrier may be the same as or different from the subcarrier spacing of the scheduled carrier. In an example in which the subcarrier spacing of the scheduling carrier is different from the subcarrier spacing of the scheduled carrier, as shown in FIG. 4A, the scheduling carrier (a CC 1 in the figure) is located in a low frequency band, the subcarrier spacing of the scheduling carrier is 15 KHz, the scheduled carrier (a CC 2 in the figure) is located in a high frequency band, and the subcarrier spacing of the scheduled carrier is 60 KHz. A network device sends scheduling information through the PDCCH on the CC 1, to indicate a resource of the PDSCH and/or a resource of the PUSCH on the CC 2 (for example, a slot in which the PDSCH and/or the PUSCH are/is located and a frequency domain position of the PDSCH and/or a frequency domain position of the PUSCH). In another example, as shown in FIG. 4B, the scheduling carrier (a CC 1 in the figure) is located in a low frequency band, the subcarrier spacing of the scheduling carrier is 15 KHz, the scheduled carrier (a CC 2 in the figure) is located in a high frequency band, and the subcarrier spacing of the scheduled carrier is 30 KHz. The network device sends the scheduling information through the PDCCH on the CC 1, to indicate the resource of the PDSCH and/or the resource of the PUSCH on the CC 2 (for example, the slot in which the PDSCH and/or the PUSCH are/is located and the frequency domain position of the PDSCH and/or the frequency domain position of the PUSCH). It should be noted that there may be a correspondence between a value of a subcarrier spacing of a carrier and a high/low frequency of the carrier. For example, a smaller subcarrier spacing of the carrier indicates that the carrier may be located in a low frequency band; and a larger subcarrier spacing of the carrier indicates that the carrier may be located in a high frequency band. In another case, carriers with different subcarrier spacings may be located in a same frequency band. This is not limited in this embodiment of this application.

In this embodiment of this application, the CC 1 and the CC 2 in any schematic diagram are only identifiers of two carriers shown in the schematic diagram, to distinguish the two carriers in the schematic diagram. There is no association relationship between the CCs 1 and between the CCs 2 in different schematic diagrams. For example, the CC 1 shown in FIG. 3 and the CC 1 shown in FIG. 4A may represent different carriers.

In a 5G NR system, a time (in a unit of slot) relationship between a PDCCH used to carry scheduling information and a scheduled PDSCH or PUSCH (namely, a relationship between a time domain position of the PDCCH used to carry scheduling information and a time domain position of the scheduled PDSCH or PUSCH) may be represented by K0 and K2.

Figure 4C:
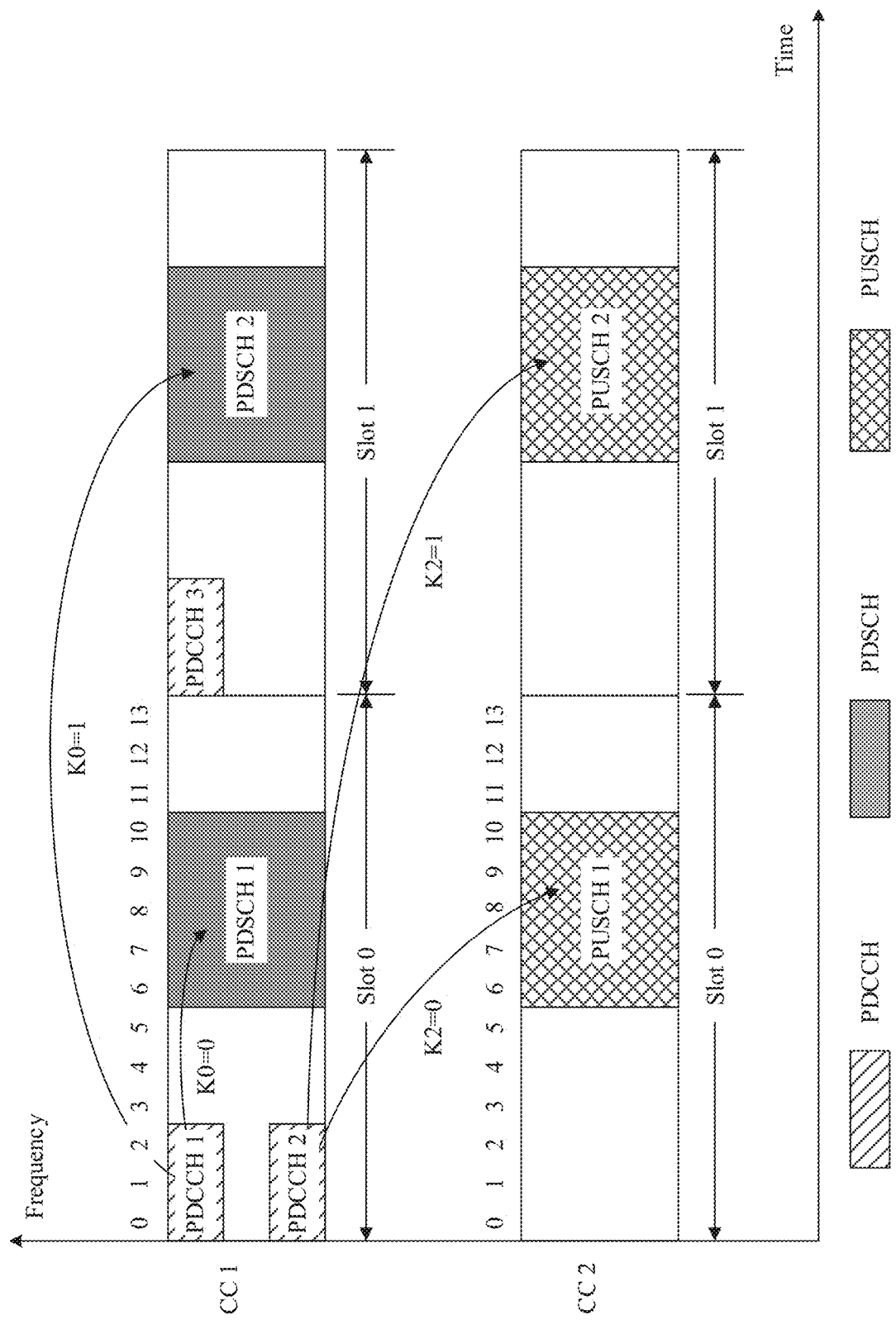
FIG. 4C and FIG. 4D are respectively schematic diagrams of values of K0 and K2 in different scenarios.

In a scenario in which the subcarrier spacing of the scheduling carrier is the same as the subcarrier spacing of the scheduled carrier, values of K0 and K2 may be determined based on a difference, in time domain, between a slot in which the PDCCH used to carry the scheduling information is located and a slot in which the scheduled PDSCH or PUSCH is located. As shown in FIG. 4C, if a data channel scheduled by a PDCCH 1 on a CC 1 is a PDSCH 1 on the CC 1, because the PDCCH 1 and the PDSCH 1 are located in a same slot (namely, a slot 0) in the CC 1, K0=0. If the data channel scheduled by the PDCCH 1 on the CC 1 is a PDSCH 2 on the CC 1, because the PDCCH 1 is located in the slot 0 in the CC 1, the PDSCH 2 is located in a slot 1 in the CC 1, and a difference, in time domain, between the PDCCH 1 and the PDSCH 2 is one slot in a unit of slot, K0=1. If a data channel scheduled by a PDCCH 2 on the CC 1 is a PUSCH 1 on the CC 2, because the PDCCH 2 is located in the slot 0 in the CC 1, the PUSCH 1 is located in a slot 0 in the CC 2, and the slot 0 in the CC 1 and the slot 0 in the CC 2 overlap in time domain, K0=0. If the data channel scheduled by the PDCCH 2 on the CC 1 is a PUSCH 2 on the CC 2, because the PDCCH 2 is located in the slot 0 in the CC 1, the PUSCH 2 is located in a slot 1 in the CC 2, and a difference, in time domain, between the PDCCH 2 and the PUSCH 2 is one slot, K0=1.

Figure 4D:
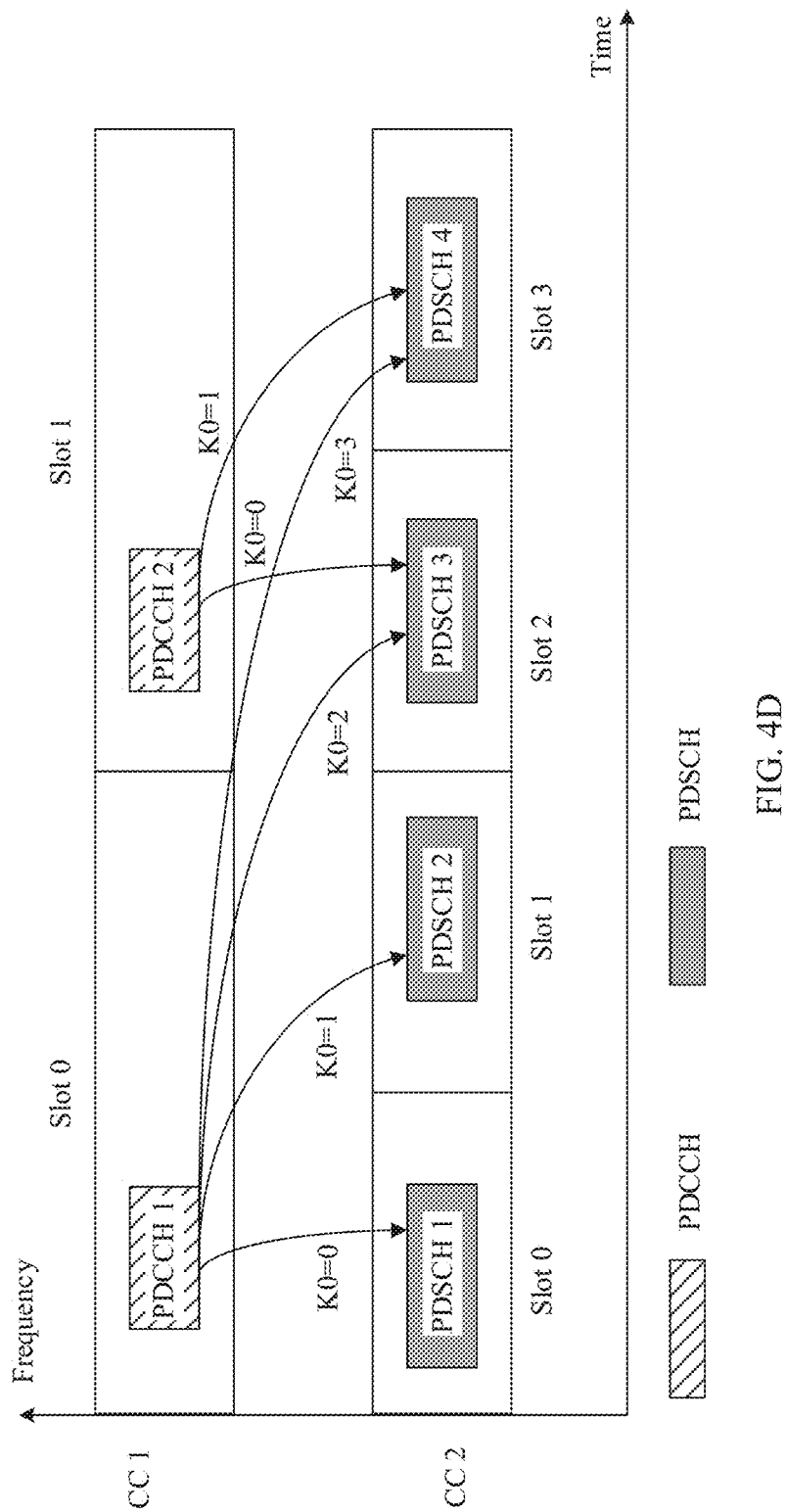

In a scenario in which the subcarrier spacing of the scheduling carrier is different from the subcarrier spacing of the scheduled carrier, the values of K0 and K2 may be explained by using the frame structure parameter of the scheduled carrier. As shown in FIG. 4D, the subcarrier spacing of the scheduling carrier (a CC 1 in the figure) is 15 KHz, and the subcarrier spacing of the scheduled carrier (a CC 2 in the figure) is 30 KHz. If a data channel scheduled by a PDCCH 1 on the CC 1 is a PDSCH 1 on the CC 2, because the PDCCH 1 is located, in time domain, in a slot 0 in the CC 2, and the PDSCH 1 is also located in the slot 0 in the CC 2, K0=0. If the data channel scheduled by the PDCCH 1 on the CC 1 is a PDSCH 2 on the CC 2, because the PDSCH 2 is located in a slot 1 in the CC 2, and a difference, in time domain, between the PDCCH 1 and the PDSCH 2 is one slot by using a slot of the CC 2 as a unit, K0=1. If the data channel scheduled by the PDCCH 1 on the CC 1 is a PDSCH 3 on the CC 2, because the PDSCH 3 is located in a slot 2 in the CC 2, and a difference, in time domain, between the PDCCH 1 and the PDSCH 3 is two slots by using the slot of the CC 2 as a unit, K0=2. Other cases are similar. For a value of K0, refer to FIG. 4D. Details are not described again. It should be noted that FIG. 4D shows only that a data channel scheduled by a PDCCH is a PDSCH. If the data channel scheduled by the PDCCH is a PUSCH, a value of K2 may be determined with reference to K0, and details are not described again.

Based on the foregoing descriptions of K0 and K2, it can be learned that in FIG. 4A, both K0 and K2 are equal to 10, and in FIG. 4B, both K0 and K2 are equal to 1. Currently, for uplink and downlink scheduling in a CA scenario, there is no additional limitation on configurations of K0 and K2. In other words, there is no limitation on a time domain position of a scheduled PDSCH or PUSCH, and various possibilities may exist. A PDCCH and a scheduled PDSCH are used as an example for description in the following.

In the 5G NR system, a network device may configure a plurality of search space sets (search space set) for a terminal device, and a configuration parameter of each search space set may include one or more of the parameters such as a PDCCH monitoring period, a PDCCH monitoring offset, a PDCCH monitoring mode, and a quantity of consecutive slots that need to be monitored in each PDCCH monitoring period. The PDCCH monitoring period is used to configure a quantity of slots as an interval at which the terminal device performs monitoring once. The PDCCH monitoring offset is used to indicate a specific slot in which the terminal device performs monitoring in a monitoring period. The PDCCH monitoring mode is used to indicate a symbol, in a slot, from which the terminal device starts monitoring. In addition, a configuration parameter of a control-resource set (control-resource set, CORESET) corresponding to each search space set includes a quantity of consecutive slots that need to be monitored in each PDCCH monitoring period. A PDCCH monitoring occasion corresponding to each search space set may be determined based on one or more of parameters such as the PDCCH monitoring period, the PDCCH monitoring offset, the PDCCH monitoring mode, and the quantity of consecutive slots (which is determined based on the configuration parameter of the CORESET corresponding to the search space) that need to be monitored in each PDCCH monitoring period. The terminal device may monitor the control channel (namely, the PDCCH) at PDCCH monitoring occasions corresponding to the plurality of search space sets. In other words, possible locations at which the PDCCH may appear are located at the PDCCH monitoring occasions.

In an implementation, the PDCCH may be located in a resource indicated by a CORESET for sending. For example, if a configured parameter range of the CORESET is that duration of the CORESET includes a maximum of three symbols, the PDCCH may occupy a maximum of three symbols, and does not cross slots. Without considering that the PDCCH occupies a plurality of symbols, a start position of the PDCCH may be located at any position in a slot. Based on the analysis of the location of the PDCCH herein, it can be learned that there are two possible scenarios for a PDCCH monitoring occasion on the terminal device. The following describes the two possible scenarios.

Figure 5A:
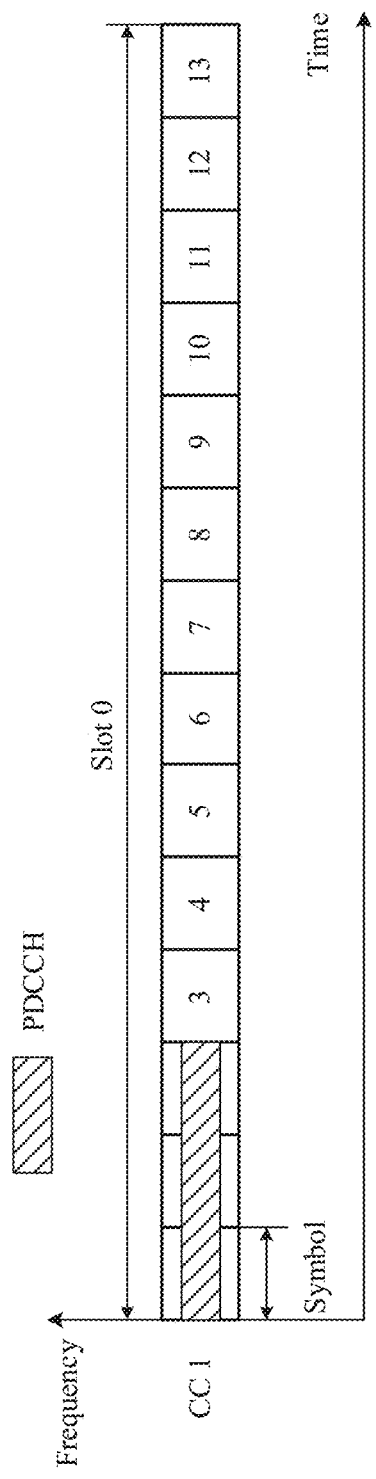
FIG. 5A is a schematic diagram of a location of a PDCCH monitoring occasion.
Figure 5B:
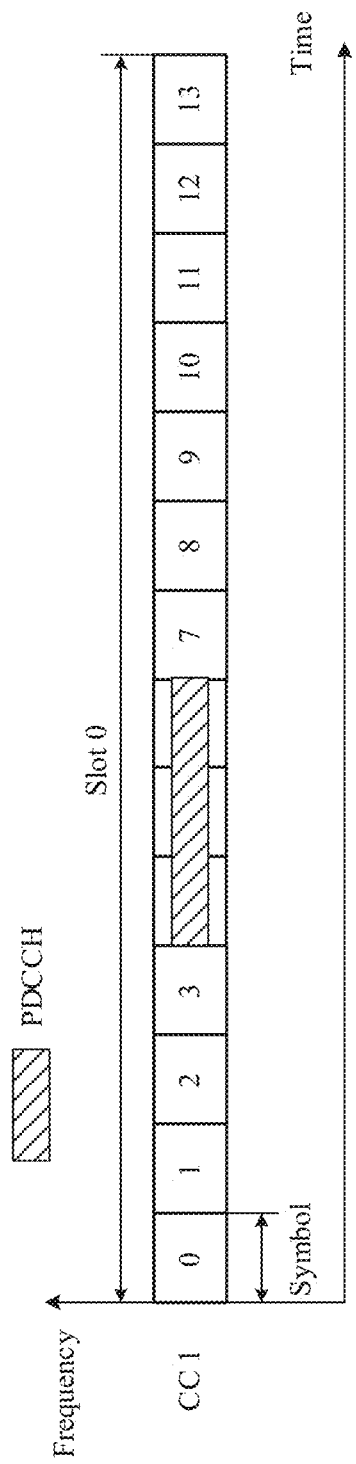
FIG. 5B is a schematic diagram of a location of another PDCCH monitoring occasion.

Scenario 1: a. The PDCCH monitoring occasion appears in first three symbols of a slot of the scheduling carrier, occupies a maximum of three consecutive symbols, and appears only once in one slot. As shown in FIG. 5A, FIG. 5A is a schematic diagram of a location of a PDCCH monitoring occasion. b. The PDCCH monitoring occasion appears in any symbol of the slot of the scheduling carrier, occupies a maximum of three consecutive symbols, and appears only once in one slot. As shown in FIG. 5B, FIG. 5B is a schematic diagram of a location of another PDCCH monitoring occasion.

Figure 5C:
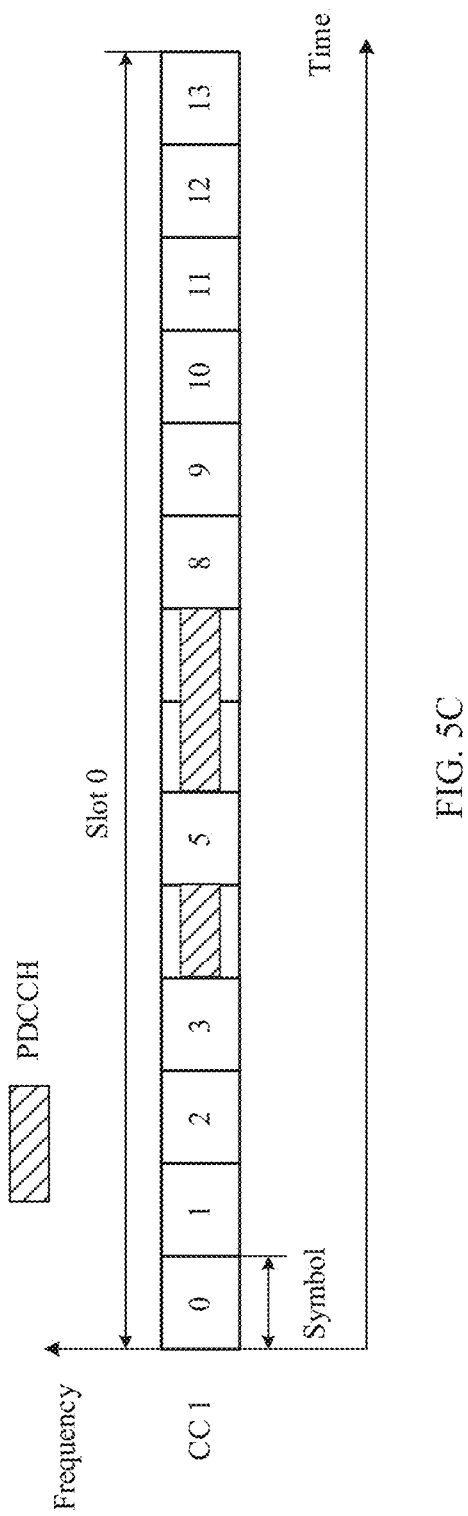
FIG. 5C is a schematic diagram of a location of another PDCCH monitoring occasion.

Scenario 2: Another configuration other than the configuration in the scenario 1 is possible, for example, a plurality of PDCCH monitoring occasions appear in one slot. As shown in FIG. 5C, FIG. 5C is a schematic diagram of a location of another PDCCH monitoring occasion.

The following uses the scenario a in the scenario 1 as an example. FIG. 6(a) and FIG. 6(b) are respectively schematic diagrams of self-carrier data scheduling and cross-carrier data scheduling. FIG. 6(a) shows self-carrier data scheduling, and FIG. 6(b) shows cross-carrier data scheduling.

As shown in FIG. 6(a), both the scheduling carrier and the scheduled carrier are a CC 2 shown in the figure. Duration occupied by a time domain position of a PDCCH is T1a, duration of a process in which the terminal device performs processing after receiving the PDCCH is Tea, and duration for processing a stored PDSCH and releasing a buffer by the terminal device is T3a. In an example, the process in which the terminal device performs processing after receiving the PDCCH may include one or more of parsing, by the terminal device, the received PDCCH and performing channel estimation on the PDSCH. The parsing, by the terminal device, the received PDCCH may include one or more of fast algorithm transformation of discrete Fourier transformation (fast Fourier transformation, FFT), PDCCH demodulation, PDCCH decoding, and DCI data parsing that are performed on PDCCH data. It may be understood that, during specific implementation, other processing may be further included. This is not limited in this embodiment of this application. In other words, the duration represented by T2a is duration from a time point at which the PDCCH ends to a time point at which the terminal device starts to process the stored PDSCH. In a scenario shown in FIG. 6(a), duration from a time point at which the terminal device receives and stores the PDSCH to a time point at which the terminal device releases the buffer is T1a+T2a+T3a. In other words, duration for storing a PDSCH before demodulation by the terminal device is T1a+T2a+T3a.

As shown in FIG. 6(b), a subcarrier spacing of the scheduling carrier (a CC 1 in the figure) is 15 KHz, and a subcarrier spacing of the scheduled carrier (a CC 2 in the figure) is 60 KHz. Duration occupied by a time domain position of a PDCCH is T1b, duration of a process in which the terminal device performs processing after receiving the PDCCH is T2b, and duration for processing a stored PDSCH and releasing a buffer (buffer) by the terminal device is T3b. For the process in which the terminal device performs processing after receiving the PDCCH, refer to the description in FIG. 6(a). Details are not described herein again. In a scenario shown in FIG. 6(b), duration from a time point at which the terminal device receives and stores the PDSCH to a time point at which the terminal device releases the buffer is T1b+T2b+T3b. In other words, duration for storing a PDSCH before demodulation by the terminal device is T1b+T2b+T3b.

It can be learned that T1b+T2b+T3b is obviously greater than T1a+T2a+T3a. In other words, in the CA scenario, when cross-carrier scheduling is configured, and the subcarrier spacing of the scheduling carrier is less than the subcarrier spacing of the scheduled carrier, the terminal device needs a larger buffer to store data before demodulation, which increases an extra processing load of the terminal device.

Based on this, an embodiment of this application provides a data scheduling method. A time domain position of a data channel (for example, a PDSCH) is limited, to effectively shorten duration for storing a PDSCH before demodulation by a terminal device, and reduce a processing load of the terminal device. The data scheduling method in this embodiment of this application may be applied to various scenarios, and is particularly applicable to a scenario in which cross-carrier scheduling is performed and a subcarrier spacing of a scheduling carrier is less than a subcarrier spacing of a scheduled carrier.

It should be noted that, in this embodiment of this application, that the subcarrier spacing of the scheduling carrier is less than the subcarrier spacing of the scheduled carrier may also be expressed as that an index value of a frame structure parameter of the scheduling carrier is less than an index value of a frame structure parameter of the scheduled carrier. It can be learned from Table 1 that the two expressions have the same meaning. The slot in the embodiments of this application may also be expressed as a time domain unit. In a normal CP case, one slot includes 14 orthogonal frequency division multiplexing (OFDM) symbols. In an extended CP case, one slot includes 12 OFDM symbols (or symbols for short). It may be understood that, in another embodiment, a quantity of symbols included in one slot may also be another quantity. This is not specifically limited. The following mainly uses an example in which one slot includes 14 symbols for description. Further, time lengths of slots on carriers with different subcarrier spacings are different. For example, a time length of one slot on the scheduling carrier (for example, the subcarrier spacing is 15 KHz) is equivalent to a time length occupied by slots on N scheduled carriers (for example, the subcarrier spacing is 60 KHz).

In an example, a value of N satisfies a formula: $N=2^{\mu1-\mu2}$ or N=SCS1/SCS2.

μ1 the index value of the frame structure parameter of the scheduled carrier, and μ2 is the index value of the frame structure parameter of the scheduling carrier. SCS 1 is the subcarrier spacing of the scheduled carrier, and SCS 2 is the subcarrier spacing of the scheduling carrier.

Figure 7:
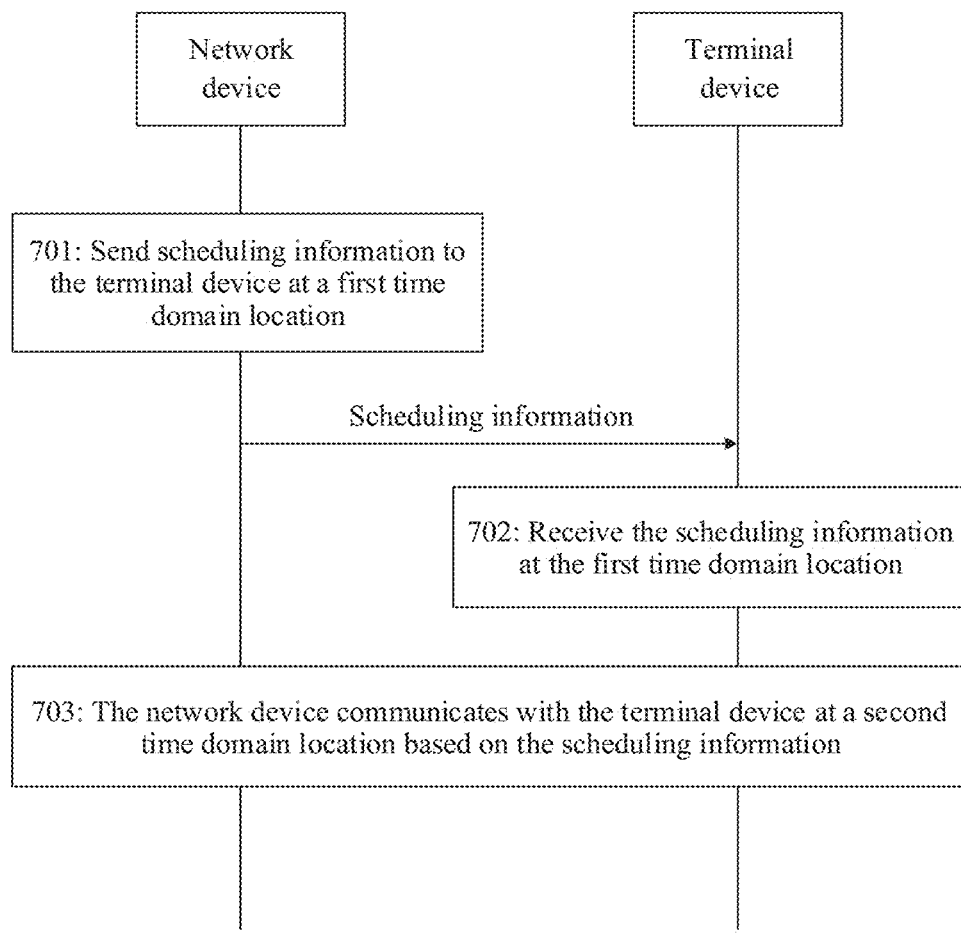
FIG. 7 is a schematic flowchart of a data scheduling method according to an embodiment of this application.

FIG. 7 is a schematic flowchart of a data scheduling method according to an embodiment of this application. As shown in FIG. 7, the method includes the following steps.

Step 701: A network device sends, at a first time domain position, scheduling information to a terminal device. Correspondingly, in a step 702, the terminal device receives, at the first time domain position, the scheduling information.

Step 703: The network device communicates with the terminal device at a second time domain position based on the scheduling information. Specifically, the network device sends or receives, at the second time domain position, data scheduled by using the scheduling information. Correspondingly, the terminal device receives or sends, at the second time domain position, the data scheduled by using the scheduling information.

In an example, the first time domain position may be a time domain position of a PDCCH carrying the scheduling information, and the second time domain position may be a time domain position of a data channel (PDSCH or PUSCH) carrying the data scheduled by using the scheduling information.

In this embodiment of this application, the first time domain position and the second time domain position may be located on different carriers, or the first time domain position and the second time domain position may be located on different BWPs. For example, the first time domain position and the second time domain position are located on different carriers. A carrier on which the first time domain position is located may be referred to as a scheduling carrier, a carrier on which the second time domain position is located may be referred to as a scheduled carrier, and a subcarrier spacing of the scheduling carrier may be less than a subcarrier spacing of the scheduled carrier.

During specific implementation, there may be a plurality of methods for limiting the second time domain position. A possible implementation method (for ease of description, referred to as a method a for short) provided in this embodiment of this application is as follows: The network device may determine the second time domain position based on the first time domain position and/or a capability of the terminal device, in other words, the second time domain position is limited by the first time domain position and/or the capability of the terminal device. The method specifically includes: (1) determining the second time domain position based on the first time domain position; (2) determining the second time domain position based on the capability of the terminal device; and (3) determining the second time domain position based on the first time domain position and the capability of the terminal device. The following separately describes the three cases in detail.

(1) Determine the second time domain position based on the first time domain position, for example, determine the second time domain position based on an end position of the first time domain position.

In an implementation, the first time domain position and second time domain position do not overlap on time domain resources. In this embodiment of this application, the first time domain position and the second time domain position may not overlap at all on the time domain resources. Further, a time domain resource occupied by the first time domain position is earlier than a time domain resource occupied by the second time domain position in terms of time.

In an example (for ease of description, an example 1 for short), that the first time domain position and the second time domain position do not overlap on the time domain resources may mean that: If the first time domain position is located in a first slot in the scheduling carrier, and the last symbol, in the first slot, occupied by the first time domain position is located in a second slot in the scheduled carrier, the second time domain position is located in any slot after the second slot in the scheduled carrier.

Figure 8A:
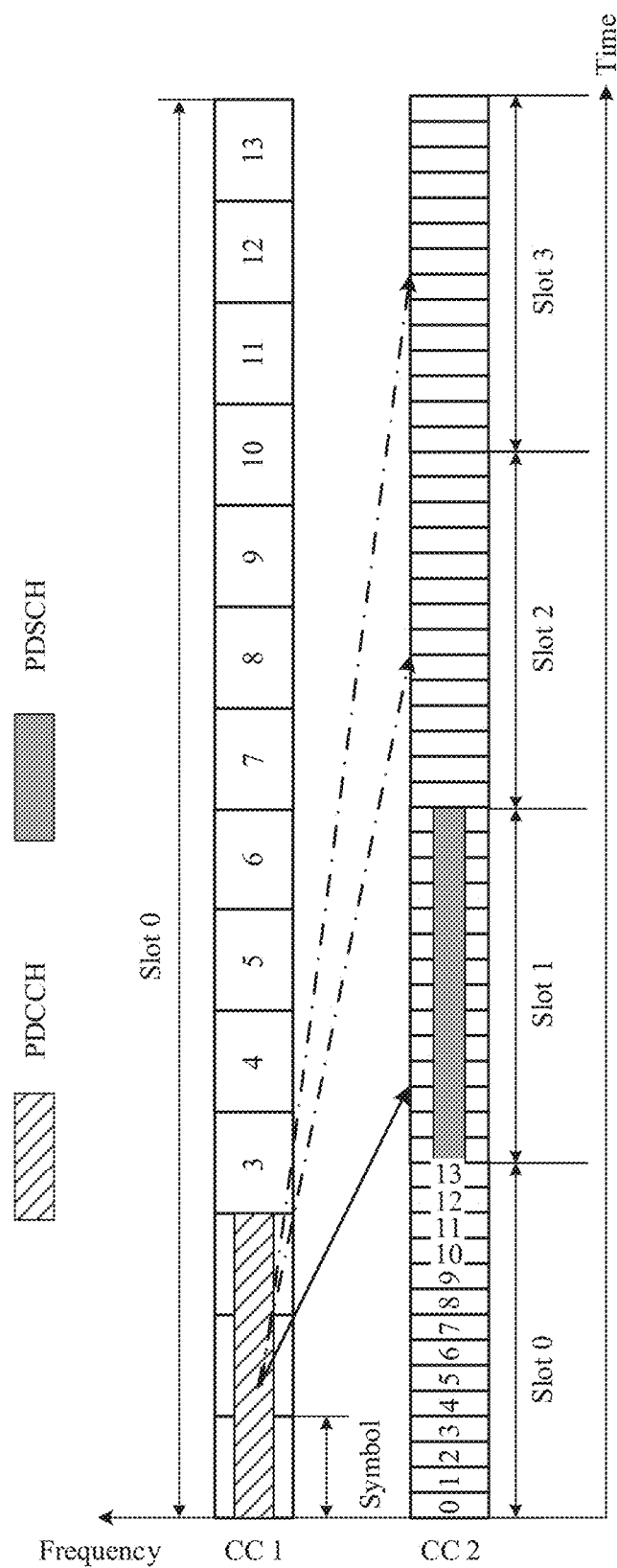
FIG. 8A, FIG. 8B, FIG. 9A, FIG. 9B, and FIG. 9 C are separately schematic diagrams of a first time domain position and a second time domain position.

FIG. 8A is a schematic diagram of the first time domain position and the second time domain position. As shown in FIG. 8A, the first time domain position is located in a slot 0 (the first slot) in the scheduling carrier (shown as a CC 1 in the figure, and a subcarrier spacing is 15 KHz), and the first time domain position occupies the first three symbols (which are a symbol 0, a symbol 1, and a symbol 2 respectively) in the slot 0. The last symbol (namely, the symbol 2), in the slot 0, occupied by the first time domain position is located in a slot 0 (the second slot) in the scheduled carrier (shown as a CC 2 in the figure, and a subcarrier spacing is 60 KHz). In this case, the second time domain position may be located in any slot after the slot 0 in the CC 2, for example, a slot 1, a slot 2, or a slot 3 in the CC 2. This is not specifically limited. It should be noted that a number carried after a slot described in this embodiment of this application is a number of the slot, and a number carried after a symbol is a number of the symbol.

It can be intuitively learned from FIG. 8A that the last symbol (namely, the symbol 2) in the slot 0 occupied by the first time domain position is located in the slot 0 in the CC 2. During specific implementation, a number of the slot that is in the scheduled carrier and in which the last symbol, in the first slot, occupied by the first time domain position is located may be determined in the following manner:

$$X=\text{Floor}\{(\text{PDCCH\_LastSymbol}+1)*N/\text{SymbsInASlot\_ScheduledCC}\} \quad \text{Formula 1}$$

In the formula 1, X is the number of the slot that is in the scheduled carrier and in which the last symbol, in the first slot, occupied by the first time domain position is located, Floor( ) represents rounding down to the nearest integer, PDCCH_LastSymbol represents a number (a value of the number is 0 to SymbsInASlot_SchedulingCC-1, and SymbsInASlot_SchedulingCC represents a quantity of symbols included in one slot in the scheduling carrier) of the last symbol, in the first slot, occupied by the first time domain position, and SymbsInASlot_ScheduledCC represents a quantity of symbols included in one slot in the scheduled carrier. In the example shown in FIG. 8A, $X=\text{Floor}\{(2+1)*4/14\}=0$.

Figure 8B:
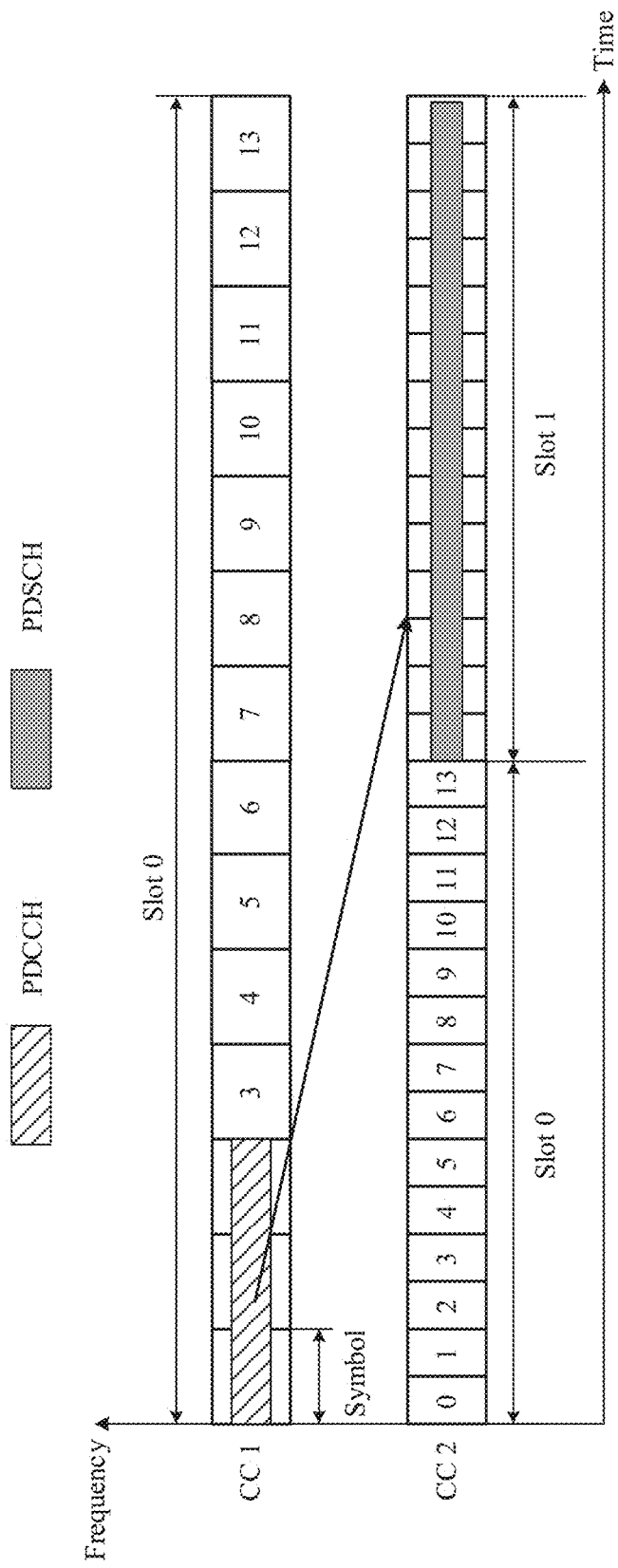

FIG. 8B is another schematic diagram of the first time domain position and the second time domain position. As shown in FIG. 8B, the first time domain position is located in a slot 0 (the first slot) in the scheduling carrier (shown as a CC 1 in the figure, and a subcarrier spacing is 15 KHz), and the first time domain position occupies the first three symbols (which are a symbol 0, a symbol 1, and a symbol 2 respectively) in the slot 0. The last symbol (namely, the symbol 2), in the slot 0, occupied by the first time domain position is located in a slot 0 (the second slot) in the scheduled carrier (shown as a CC 2 in the figure, and a subcarrier spacing is 30 KHz). In this case, the second time domain position may be located in any slot after the slot 0 in the CC 2, for example, a slot 1 in the CC 2. This is not specifically limited. Similarly, in this example, a number X of a slot that is in the scheduled carrier and in which the last symbol, in the first slot, occupied by the first time domain position is located may also be obtained according to the foregoing formula 1: $X=\text{Floor}\{(2+1)*2/14\}=0$.

In another example (for ease of description, an example 2 for short), that the first time domain position and the second time domain position do not overlap on the time domain resources may mean that: If the first time domain position is located in the first slot in the scheduling carrier, and the last symbol, in the first slot, occupied by the first time domain position is located in the second slot in the scheduled carrier, the second time domain position is located in the second slot, and a symbol, in the second slot, occupied by the second time domain position is located after the last symbol, in the first slot, occupied by the first time domain position.

Figure 9A:
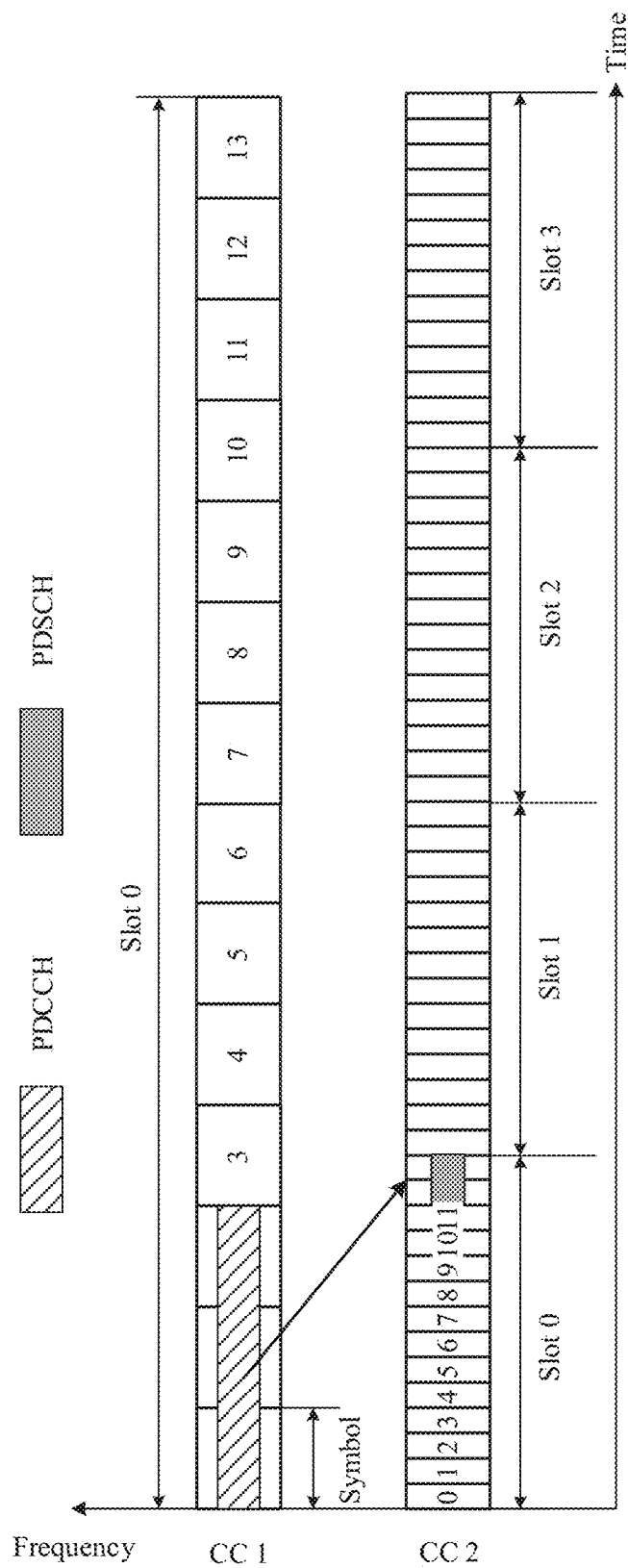

FIG. 9A is another schematic diagram of the first time domain position and the second time domain position. As shown in FIG. 9A, the first time domain position is located in a slot 0 (the first slot) in the scheduling carrier (shown as a CC 1 in the figure, and a subcarrier spacing is 15 KHz), and the first time domain position occupies the first three symbols (which are a symbol 0, a symbol 1, and a symbol 2 respectively) in the slot 0. The last symbol (namely, the symbol 2), in the slot 0, occupied by the first time domain position is located in a slot 0 (the second slot) in the scheduled carrier (shown as a CC 2 in the figure, and a subcarrier spacing is 60 KHz). In this case, the second time domain position may be located in the slot 0 in the CC 2, and a symbol, in the slot 0 in the scheduled carrier, occupied by the second time domain position is located after the last symbol, in the slot 0 in the scheduling carrier, occupied by the first time domain position. For example, symbols that are in the slot 0 in the scheduled carrier and that may be occupied by the second time domain position may be a symbol 12 and a symbol 13, where a start symbol that is in the slot 0 in the scheduled carrier and that may be occupied by the second time domain position is the symbol 12, and a quantity of symbols is 2.

The start symbol that is in the slot 0 of the scheduled carrier and that may be occupied by the second time domain position and the quantity of symbols that can be occupied by the second time domain position may be intuitively learned from FIG. 9A. During specific implementation, the start symbol that is in the slot 0 of the scheduled carrier and that may be occupied by the second time domain position may be obtained according to the following formula:

$$Y=(\text{PDCCH\_LastSymbol}+1)*N-1 \quad \text{Formula 2}$$

In the formula 2, Y is a number of a symbol before the start symbol that is in the slot 0 of the scheduled carrier and that may be occupied by the second time domain position. In the example shown in FIG. 9A, $Y=(2+1)*4-1=11$. Therefore, a number of the start symbol that is in the slot 0 of the scheduled carrier and that may be occupied by the second time domain position is 12.

The quantity of symbols that are in the slot 0 of the scheduled carrier and that may be occupied by the second time domain position may be calculated according to the following formula:

$$Z=\text{SymbsInASlot\_ScheduledCC}-Y-1=14-11-1=2 \quad \text{Formula 3}$$

In the formula 3, Z is the quantity of symbols that are in the slot 0 of the scheduled carrier and that may be occupied by the second time domain position. In the example shown in FIG. 9A, $Z=14-11-1=2$.

Figure 9B:
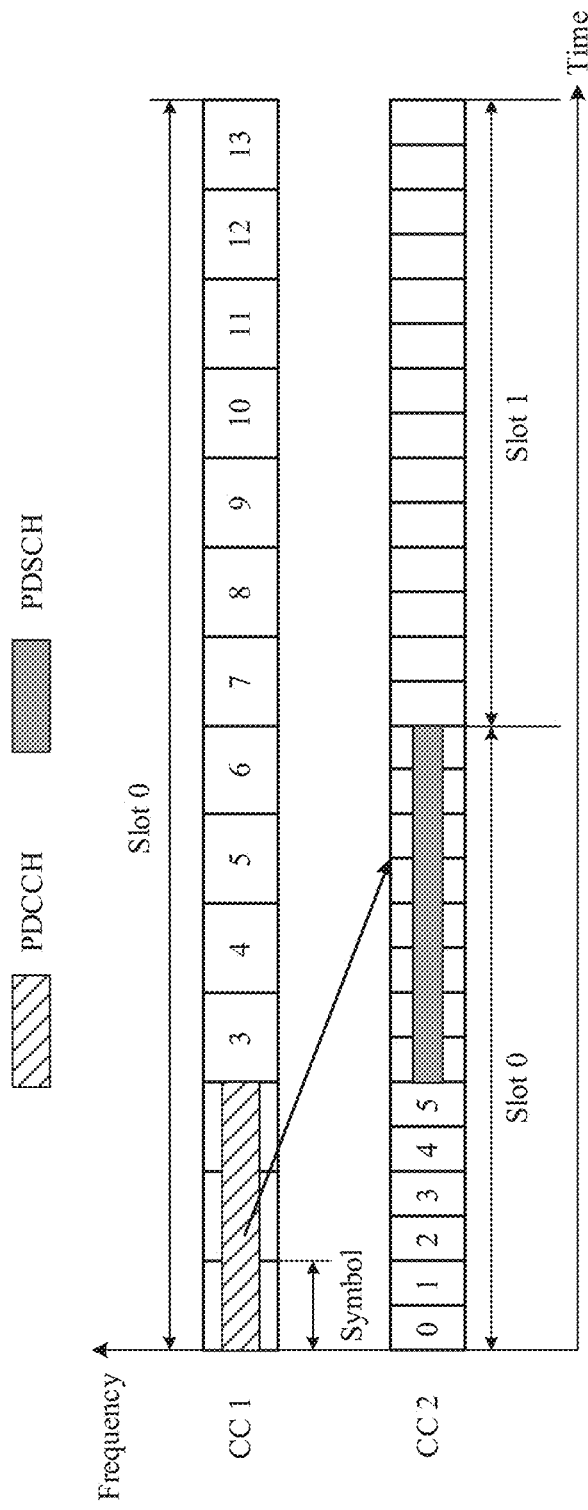

FIG. 9B is another schematic diagram of the first time domain position and the second time domain position. As shown in FIG. 9B, the first time domain position is located in a slot 0 (the first slot) in the scheduling carrier (shown as a CC 1 in the figure, and a subcarrier spacing is 15 KHz), and the first time domain position occupies the first three symbols (which are a symbol 0, a symbol 1, and a symbol 2 respectively) in the slot 0. The last symbol (namely, the symbol 2), in the slot 0, occupied by the first time domain position is located in a slot 0 (the second slot) in the scheduled carrier (shown as a CC 2 in the figure, and a subcarrier spacing is 30 KHz). In this case, the second time domain position may be located in the slot 0 in the CC 2, and a symbol, in the slot 0 in the scheduled carrier, occupied by the second time domain position is located after the last symbol, in the slot 0 in the scheduling carrier, occupied by the first time domain position. For example, symbols that are in the slot 0 in the scheduled carrier and that may be occupied by the second time domain position may be a symbol 6, a symbol 7, a symbol 8, a symbol 9, a symbol 10, a symbol 11, a symbol 12 and a symbol 13, where a start symbol that is in the slot 0 in the scheduled carrier and that may be occupied by the second time domain position is the symbol 6, and a quantity of symbols is 8.

Similarly, in this example, Y=(2+1)*2−1=5 may also be obtained according to the formula 2. Therefore, a number of the start symbol that is in the slot 0 in the scheduled carrier and that may be occupied by the second time domain position is 6. It is obtained according to the formula 3 that Z=14−5−1=8. Therefore, the quantity of symbols that are in the slot 0 in the scheduled carrier and that may be occupied by the second time domain position is 8.

Figure 9C:
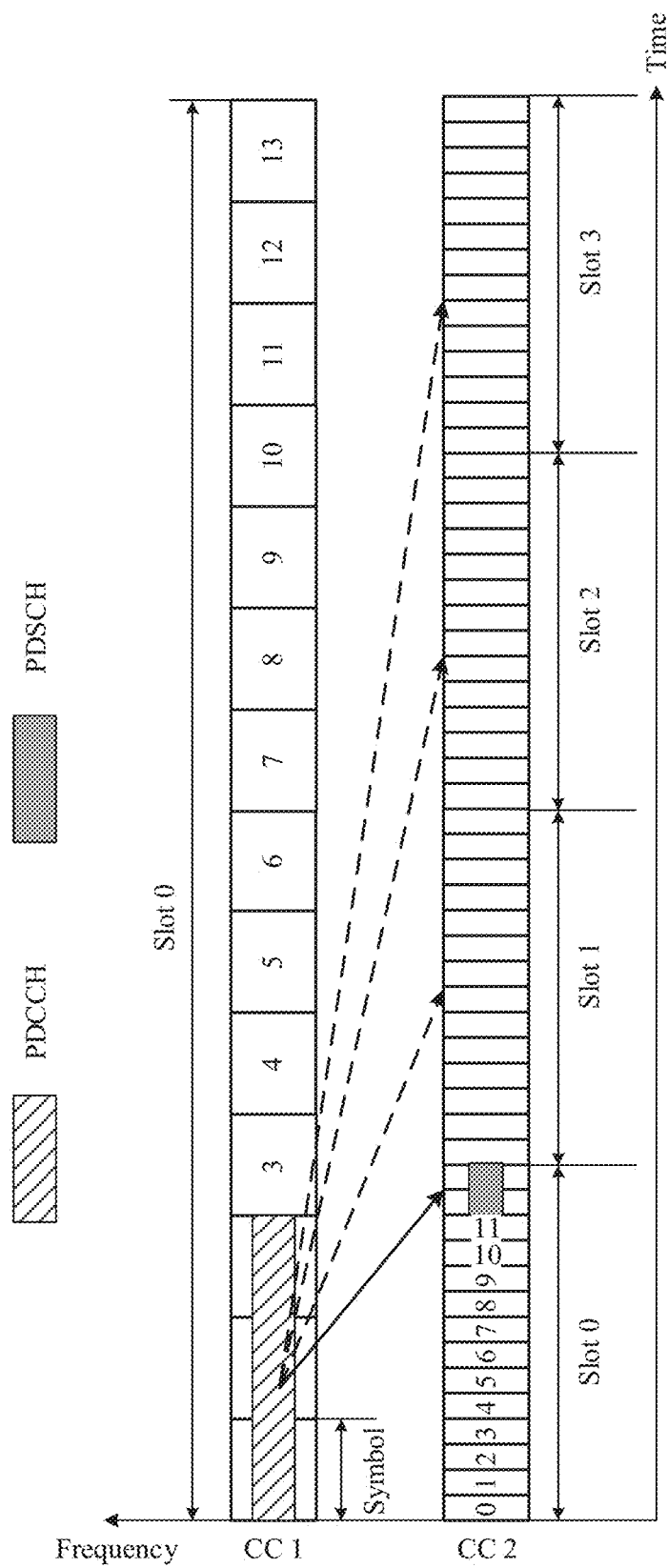

It should be noted that, during specific implementation, the methods described in the example 1 (referring to FIG. 8A and FIG. 8B) and the example 2 (referring to FIG. 9A and FIG. 9B) may be separately applied, or may be applied in combination. If the two methods are applied in combination, it may be learned from FIG. 9C that the second time domain position may be the symbol 12 and the symbol 13 in the slot 0, or may be located in any slot after the slot 0. In addition, if the second time domain position is located in any slot after the slot 0, the second time domain position may be any location in the slot.

(2) Determine the second time domain position based on the capability of the terminal device.

In this embodiment of this application, the capability of the terminal device may include a buffer size of the terminal device and/or a processing capability of the terminal device. A buffer of the terminal device herein may be used to store data before demodulation, for example, store a PDSCH before demodulation. In this case, the buffer of the terminal device may also be referred to as a receiving buffer or a downlink receiving buffer. Alternatively, the buffer of the terminal device may be used to store to-be-sent data, for example, store a to-be-sent PUSCH (the PUSCH needs to be placed into a to-be-sent data buffer before sending). In this case, the buffer of the terminal device may also be referred to as a sending buffer or an uplink sending buffer. In the description of this embodiment of this application, that the buffer of the terminal device is used to store the PDSCH before demodulation is merely used as an example. This embodiment of this application may also be applicable to a scenario in which the buffer of the terminal device is used to store the PUSCH before sending.

The processing capability of the terminal device may include any one or more of the following: a capability of processing scheduling information and a capability of processing data. Optionally, the processing capability of the terminal device may further include a capability of monitoring a PDCCH. In another embodiment, the processing capability of the terminal device may further include other information, and this is not specifically limited in this embodiment of this application. The capability of processing scheduling information may also be referred to as a capability of processing a PDCCH. For example, the capability of processing a PDCCH may include a capability of performing FFT, demodulation, decoding, and PDCCH blind detection on the PDCCH by the terminal device. The capability of processing data may also be referred to as a capability of processing a data channel. For example, the capability of processing a data channel may include a capability of processing a PDSCH and/or a capability of processing a PUSCH. The capability of processing a PDSCH may include a capability of demodulating and decoding the PDSCH by the terminal device. Specifically, the capability of processing a PDSCH is related to duration from a time point at which the terminal device starts to process the PDSCH to a time point at which a buffer can be released. The capability of processing a PUSCH is related to duration in which the terminal device prepares the PUSCH. The duration in which the terminal device prepares the PUSCH is duration from a time point at which the terminal device receives a PDCCH to a time point at which the terminal device can send the PUSCH. The capability of monitoring a PDCCH may refer to a capability of supporting a specific PDCCH monitoring scenario by the terminal.

The network device may obtain the buffer size of the terminal device in a plurality of manners. In an implementation, the terminal device may determine the buffer size of the terminal device, and report the buffer size of the terminal device to the network device. For example, the terminal device may actively report the buffer size to the network device, or the terminal device may report the buffer size to the network device after receiving a request message from the network device. A specific reporting manner is not limited in this embodiment of this application.

Figure 10:
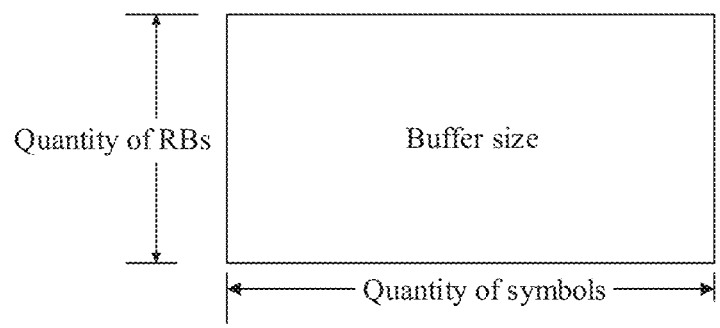
FIG. 10 is a schematic diagram of a buffer size of a terminal device according to an embodiment of this application.

FIG. 10 is a schematic diagram of the buffer size of the terminal device. The following describes in detail a possible implementation process in which the terminal device determines the buffer size of the terminal device.

A channel bandwidth that can be supported by the terminal device in a frequency range 1 (FR 1) is shown in Table 2, where the frequency range represented by the FR 1 is 450 MHz to 6000 MHz.

TABLE 2

| | Channel bandwidth that can be supported by the terminal device in the frequency range 1 | | | | | | | | | | | |
|---|---|---|---|---|---|---|---|---|---|---|---|---|
| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 100 MHz $N_{RB}$ |
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

It can be learned from Table 2 that any channel bandwidth supported by the terminal device may be configured as a plurality of frame structures, and different frame structures correspond to different quantities of RBs. Therefore, the terminal device needs to determine the buffer size based on the supported channel bandwidth. Further, for a same channel bandwidth, frequency domains corresponding to different quantities of RBs have different pieces of data (one RB corresponds to 12 subcarriers and corresponds to 12 pieces of data in a frequency domain). Because the terminal device cannot determine which frame structure is to be configured, the buffer size can be generally determined based on a case in which there is a maximum quantity of RBs. In addition, during downlink data scheduling (for example, PDSCH scheduling), a PDSCH in a slot of one scheduling may include a maximum of 14 symbols. Therefore, the downlink data scheduling may also be referred to as PDSCH Type A scheduling, and belongs to a type of slot scheduling. To support such basic scheduling, the buffer of the terminal device may be not less than 14 symbols. Based on this, in an example, if the channel bandwidth supported by the terminal device is 50 MHz, a determined buffer size is approximately 270 RBs*14 symbols.

In another implementation, the network device may obtain the processing capability of the terminal device, and determine the buffer size of the terminal device based on the processing capability of the terminal device. The network device may obtain the processing capability of the terminal device in a plurality of manners. For example, the terminal device may report the processing capability of the terminal device to the network device. Further, the network device may determine the downlink receiving buffer of the terminal device based on at least one of the capability of processing a PDCCH, the capability of processing a PDSCH, and the capability of monitoring a PDCCH. The network device may determine the uplink sending buffer of the terminal device based on the capability of processing a PUSCH.

In this embodiment of this application, that the network device determines the second time domain position based on the buffer size of the terminal device may mean that the network device determines, based on the buffer size of the terminal device, whether to limit the second time domain position. Details are described below.

In a possible implementation (the implementation may be applicable to the foregoing scenario 1 described for the PDCCH monitoring occasion on the terminal device), for ease of description of a limitation case, a comparison value M is introduced in this embodiment of this application, and M may be calculated according to the following formula:

$$M = N_{buffer} - N_1 - N_2$$

In this formula, $N_{buffer}$ is a quantity of symbols corresponding to the buffer size of the terminal device, $N_1$ is a quantity of symbols that are on the scheduled carrier and that correspond to duration (T1) occupied by a time domain position of a PDCCH, $N_2$ is a quantity of symbols that are on the scheduled carrier and that correspond to duration (T2) for the terminal device to perform processing after receiving the PDCCH.

Figure 11A:
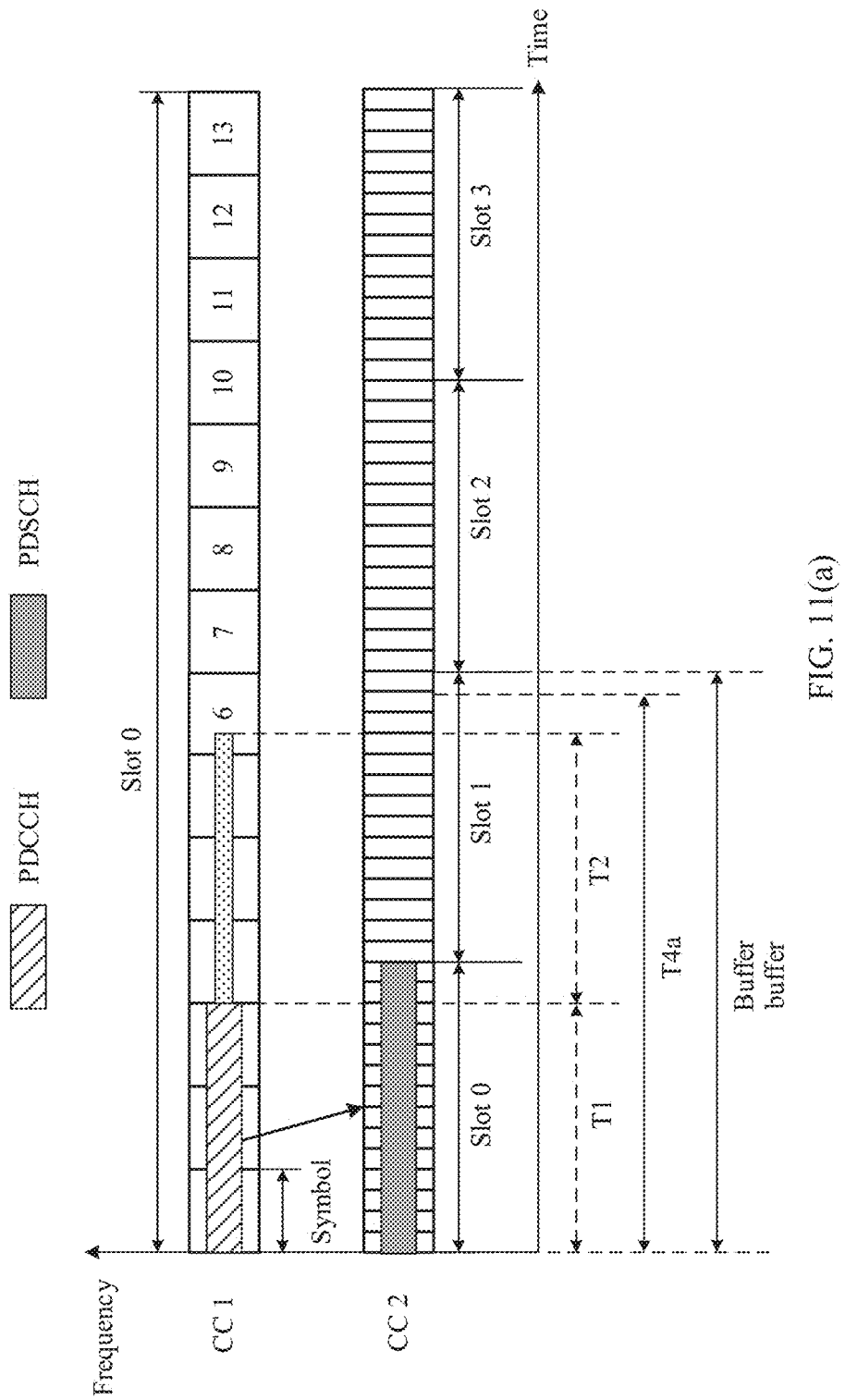
FIG. 11(a), FIG. 11(b) and FIG. 11(c) are a schematic diagram of a case in which whether to limit a second time domain position is determined based on a capability of a terminal device.
Figure 11B:
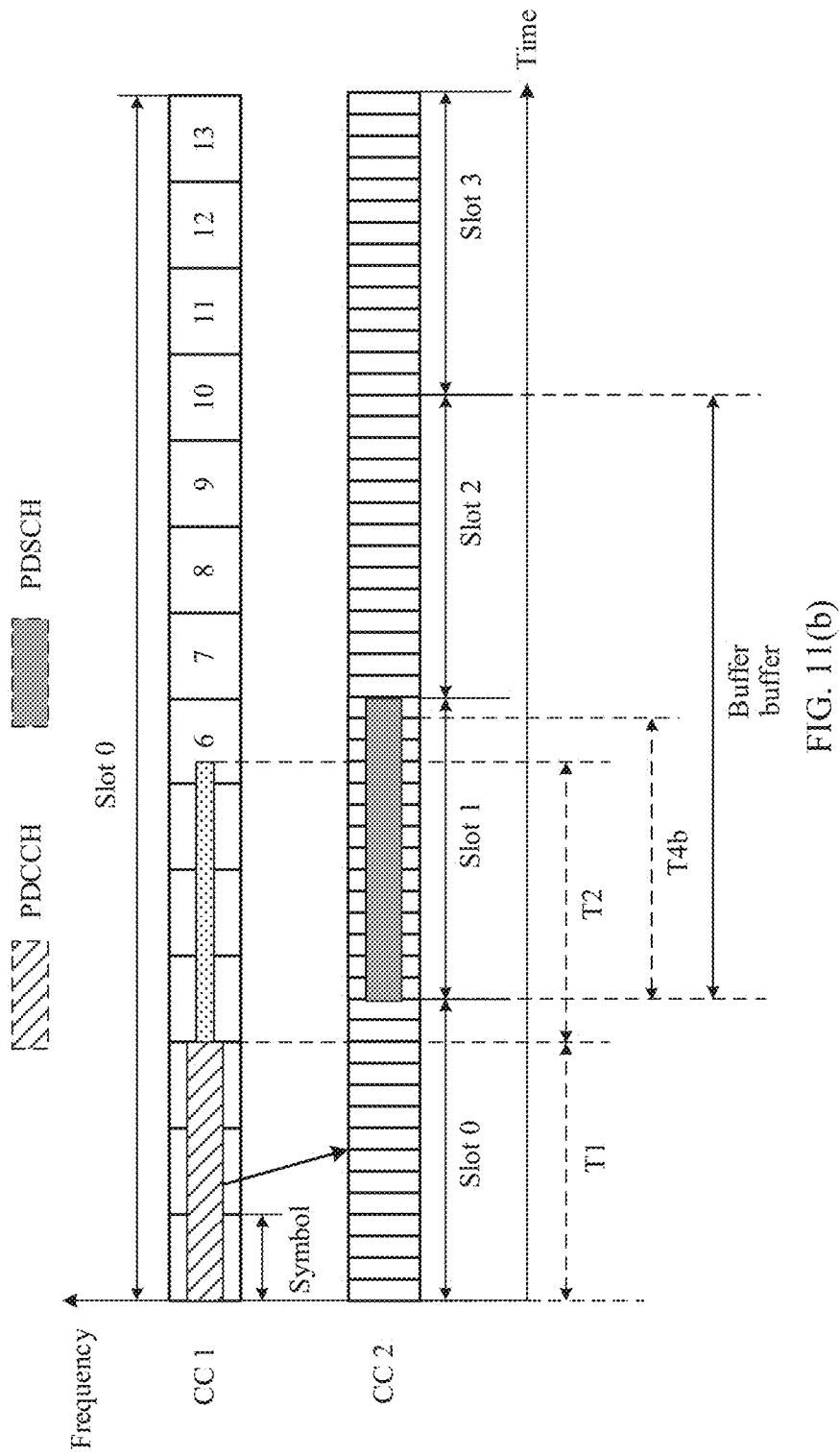
Figure 11C:
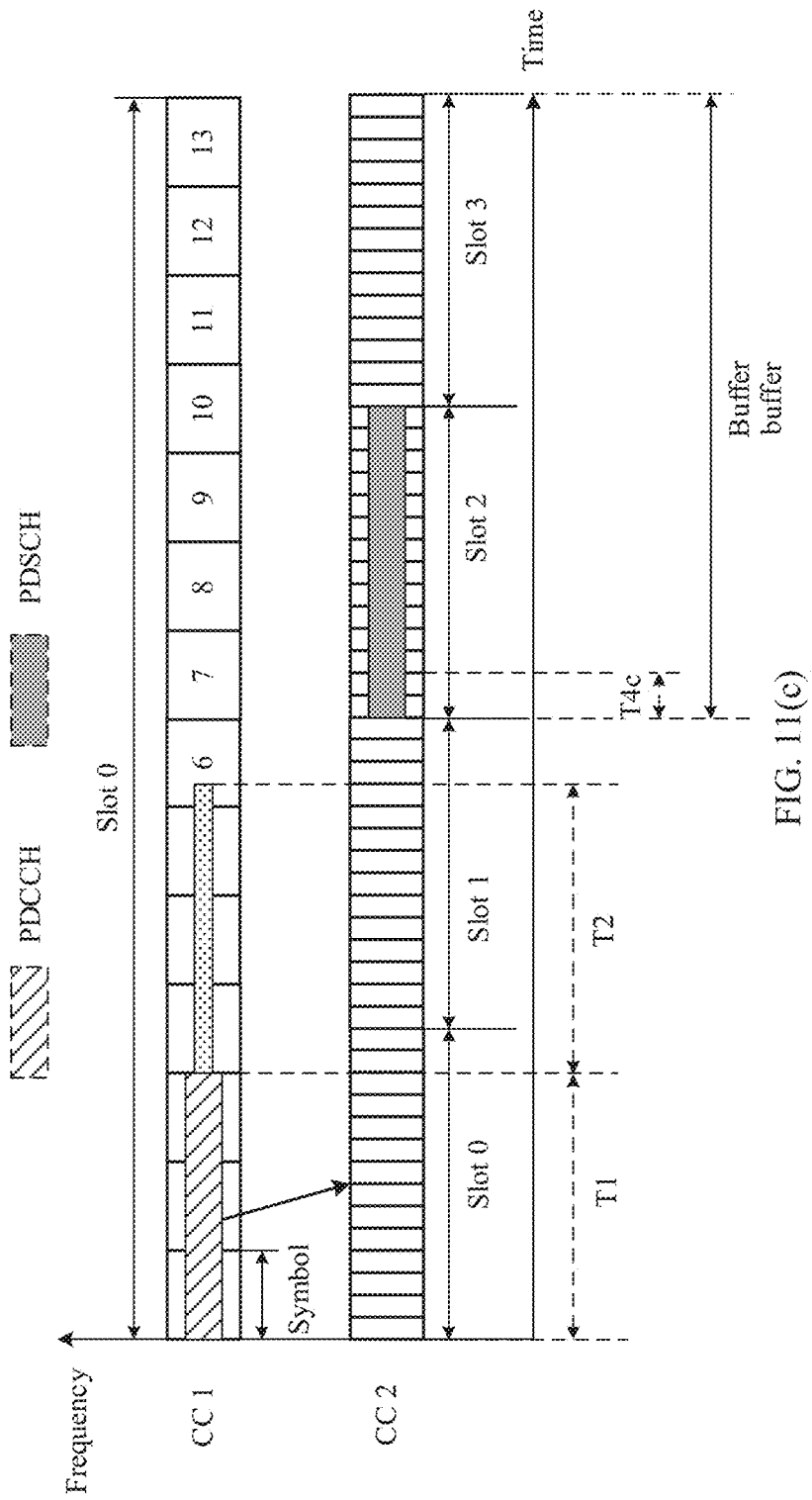

In an example shown in FIG. 11(a), FIG. 11(b) and FIG. 11(c), $N_{buff}$=28, $N_1$=12, $N_2$=13, and M=28−12−13=3. In this case, as shown in FIG. 11(a), if the second time domain position is located in a slot 0 of a CC 2, duration for storing the data before demodulation by the terminal device is T4a. It may be learned that a quantity of symbols corresponding to T4a on the scheduled carrier is less than a quantity of symbols corresponding to the buffer size of the terminal on the scheduled carrier. Therefore, when the second time domain position is located in the slot 0 of the CC 2, a processing load of the terminal device is not increased. As shown in FIG. 11(b), if the second time domain position is located in a slot 1 of a CC 2, a start time point at which the terminal device stores the data before demodulation is a start point of the second time domain position, and the duration for storing the data before demodulation by the terminal device is T4b. It may be learned that a quantity of symbols corresponding to T4b on the scheduled carrier is less than a quantity of symbols corresponding to the buffer size of the terminal on the scheduled carrier. Therefore, when the second time domain position is located in the slot 1 of the CC 2, the processing load of the terminal device is not increased. As shown in FIG. 11(c), if the second time domain position is located in a slot 2 of a CC 2, the start time point at which the terminal device stores the data before demodulation is the start point of the second time domain position, and the duration for storing the data before demodulation by the terminal device is T4c. It may be learned that a quantity of symbols corresponding to T4c on the scheduled carrier is less than a quantity of symbols corresponding to the buffer size of the terminal on the scheduled carrier. Therefore, when the second time domain position is located in the slot 2 of the CC 2, the processing load of the terminal device is not increased. For a case in which the second time domain position is located in any slot after the slot 2 of the CC 2, refer to the case in which the second time domain position is located in the slot 2 of the CC 2. Details are not described herein again.

Based on the foregoing content, it can be learned that when M=28−12−13=3>0, the second time domain position may not be limited. In other words, the second time domain position may be located in the slot 0 of the CC 2 or in any slot after the slot 0.

Figure 12A:
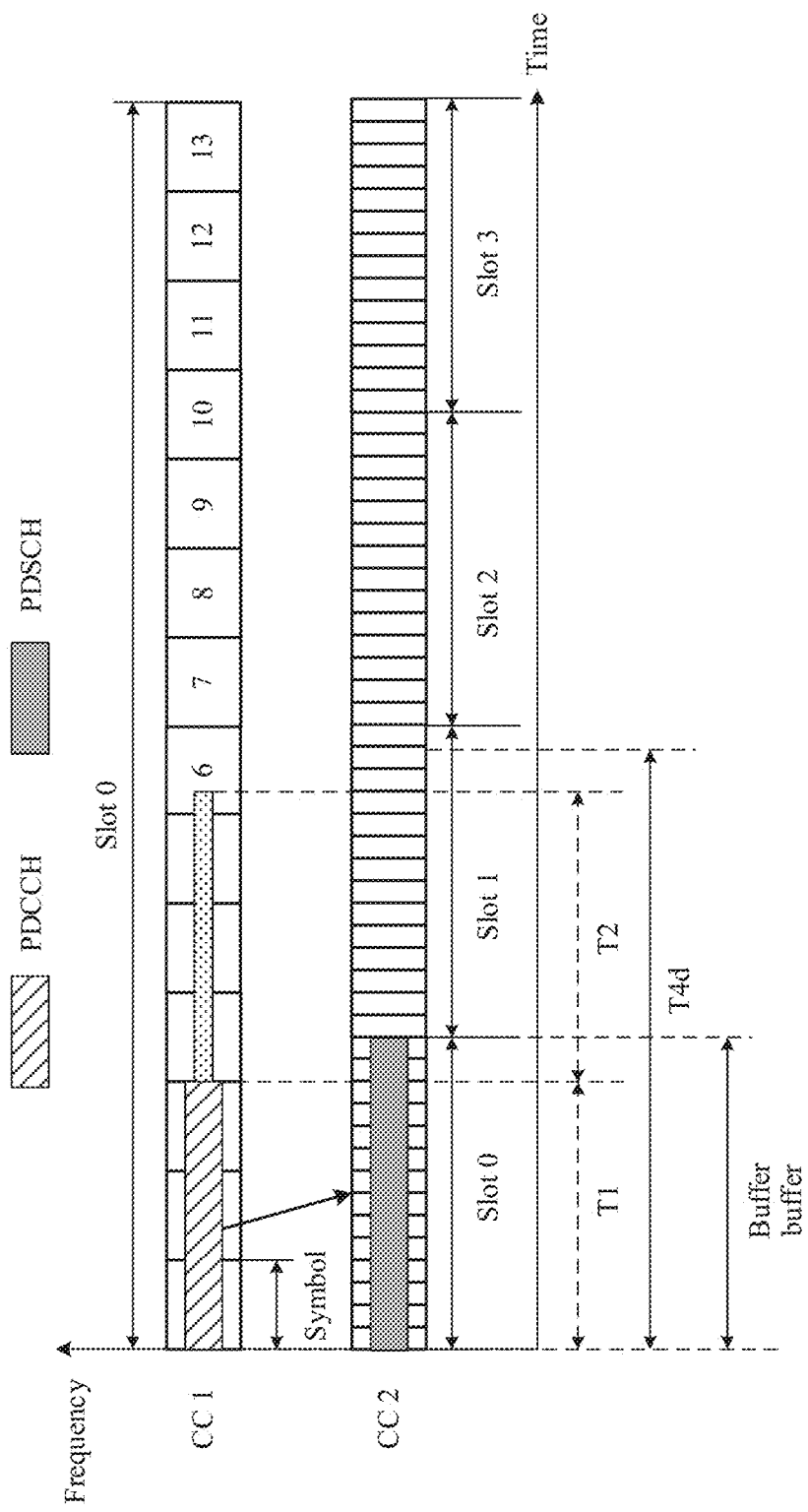
Figure 12B:
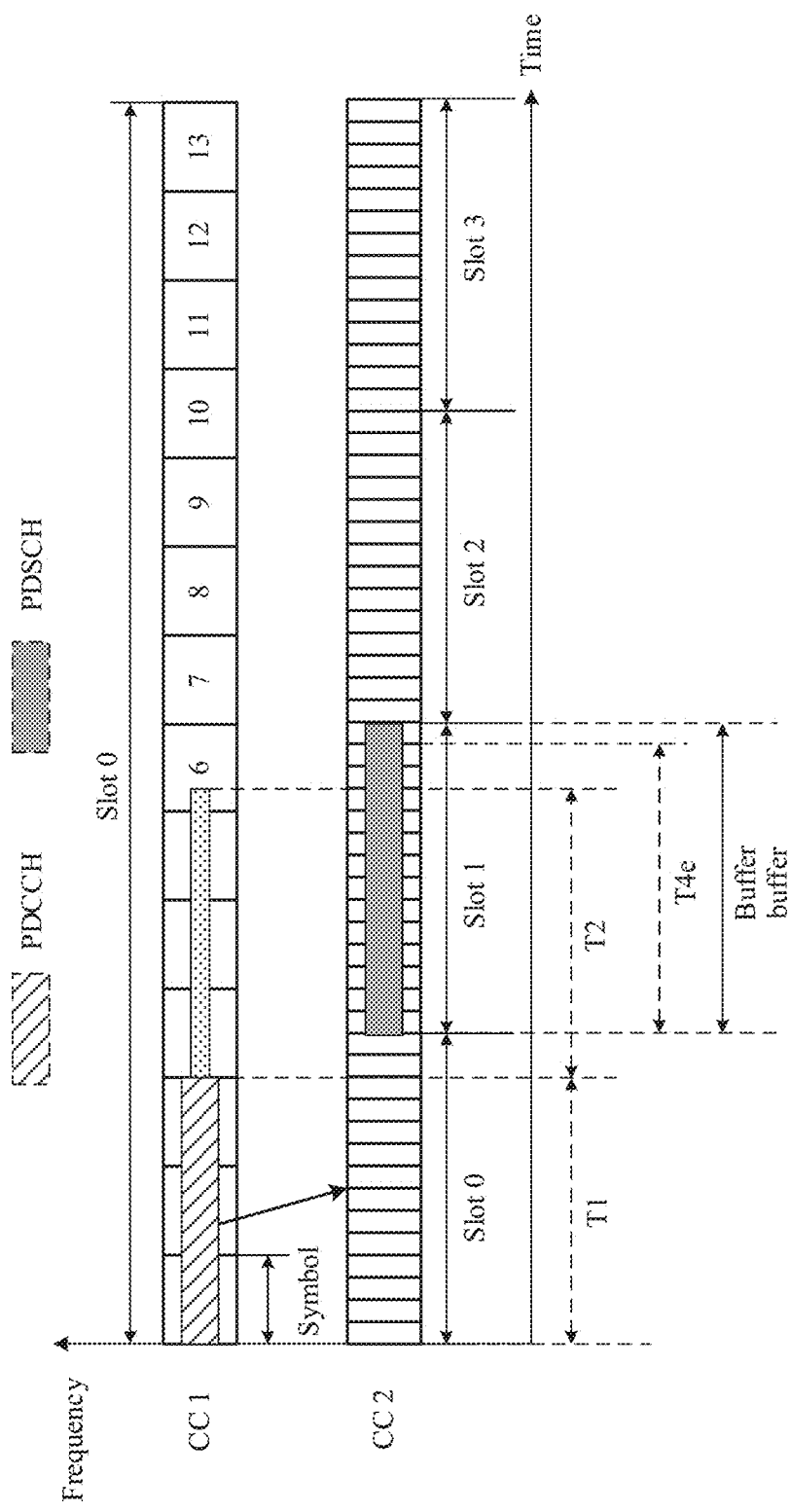

In an example shown in FIG. 12(a), FIG. 12(b) and FIG. 12(c), $N_{buffer}$=14, $N_1$=12, $N_2$=13, and M=14−12−13=−11. In this case, as shown in FIG. 12(a), if the second time domain position is located in a slot 0 of a CC 2, the duration for storing the data before demodulation by the terminal device is T4d. It may be learned that a quantity of symbols corresponding to T4d on the scheduled carrier is greater than a quantity of symbols corresponding to the buffer size of the terminal on the scheduled carrier. Therefore, when the second time domain position is located in the slot 0 of the CC 2, the processing load of the terminal device is increased. As shown in FIG. 12(b), if the second time domain position is located in a slot 1 of a CC 2, the start time point at which the terminal device stores the data before demodulation is the start point of the second time domain position, and the duration for storing the data before demodulation by the terminal device is T4e. It may be learned that a quantity of symbols corresponding to T4e on the scheduled carrier is less than a quantity of symbols corresponding to the buffer size of the terminal on the scheduled carrier. Therefore, when the second time domain position is located in the slot 1 of the CC 2, the processing load of the terminal device is not increased. As shown in FIG. 12(c), if the second time domain position is located in a slot 2 of a CC 2, the start time point at which the terminal device stores the data before demodulation is the start point of the second time domain position, and the duration for storing the data before demodulation by the terminal device is T4f. It may be learned that a quantity of symbols corresponding to T4f on the scheduled carrier is less than a quantity of symbols corresponding to the buffer size of the terminal on the scheduled carrier. Therefore, when the second time domain position is located in the slot 2 of the CC 2, the processing load of the terminal device is not increased. For a case in which the second time domain position is located in any slot after the slot 2 of the CC 2, refer to the case in which the second time domain position is located in the slot 2 of the CC 2. Details are not described herein again.

It can be learned based on the foregoing content that, when M=14−12−13=−11<0 (in this case, it may also be understood that duration, on the scheduled carrier, of an amount of data that can be stored in the buffer of the terminal device is less than duration from a start point of the first time domain position to a time point at which the terminal device completes channel estimation of the data channel), the second time domain position needs to be limited, and a possible limiting method is to determine the second time domain position based on the first time domain position. For details, refer to the foregoing descriptions.

In this embodiment of this application, a first threshold may be preset. If M is greater than or equal to the first threshold, the second time domain position may not be limited. If M is less than the first threshold, the second time domain position may be limited. In an example, the first threshold may be equal to 0. When a time offset caused by another processing or data scheduling time is considered, the first threshold may also be another value.

It should be noted that the network device may further determine, based on the capability (for example, the capability of processing a PDCCH or the capability of processing a PDSCH) of the terminal device, whether to limit a time domain position of a data channel scheduled by the terminal device. For example, after the processing capability of the terminal device is enhanced, the time domain position of the data channel scheduled by the terminal device may no longer need to be limited. After the processing capability of the terminal device becomes weak, the time domain position of the data channel scheduled by the terminal device may need to be limited. Details are described below.

After the processing capability of the terminal device is enhanced, for example, if the capability of processing a PDCCH is enhanced, a length of T1. shown in FIG. 11(a), FIG. 11(b), FIG. 11(c), FIG. 12(a), FIG. 12(b), FIG. 12(c), FIG. 13(a), or FIG. 13(b) becomes shorter. If the capability of processing a PDSCH is enhanced, a length of T2 shown in FIG. 11(a), FIG. 11(b), FIG. 11(c), FIG. 12(a), FIG. 12(b), FIG. 12(c), FIG. 13(a), or FIG. 13(b) becomes shorter. Therefore, when the buffer size of the terminal device remains unchanged, the comparison value M correspondingly becomes larger. For example, $N_{buffer}$ of each of a terminal device 1 and a terminal device 2 is 28, a quantity $N_1$ of symbols that are on the scheduled carrier and that correspond to duration (T1) occupied by a time domain position of a PDCCH is 12, a processing capability of the terminal device 1 is N2=18, and a processing capability of the terminal device 2 is N2=13. In this case, for the terminal device 1, M=28−12−18=−2<0, and for the terminal device 2, M=28−12−13=3>0. Therefore, for the terminal device 1, the second time domain position needs to be limited, and for the terminal device 2, the second time domain position does not need to be limited. If the processing capability of the terminal device 1 is enhanced subsequently, for example, the processing capability of the terminal device 1 is improved to N2=15, for the terminal device 1, M=28−12−15=1>0. It can be learned that when a buffer size of the terminal device 1 remains unchanged, because the processing capability of the terminal device 1 is improved, the comparison value M correspondingly becomes larger, and there is no need to limit the second time domain position. For a case in which the processing capability of the terminal device becomes weak, refer to the case in which the processing capability of the terminal device is enhanced. The two cases have a same train of thought, and details are not described herein again.

(3) Determine the second time domain position based on the capability of the terminal device and the first time domain position.

In this embodiment of this application, determining the second time domain position based on the capability of the terminal device and the first time domain position may be: first determining, based on the capability of the terminal device, whether the second time domain position needs to be limited, and then determining the second time domain position based on the first time domain position. In other words, in this case, whether the second time domain position needs to be limited may be first determined based on the content described in (2). If the second time domain position needs to be limited, the second time domain position may be determined based on the content described in (1).

Figure 13A:
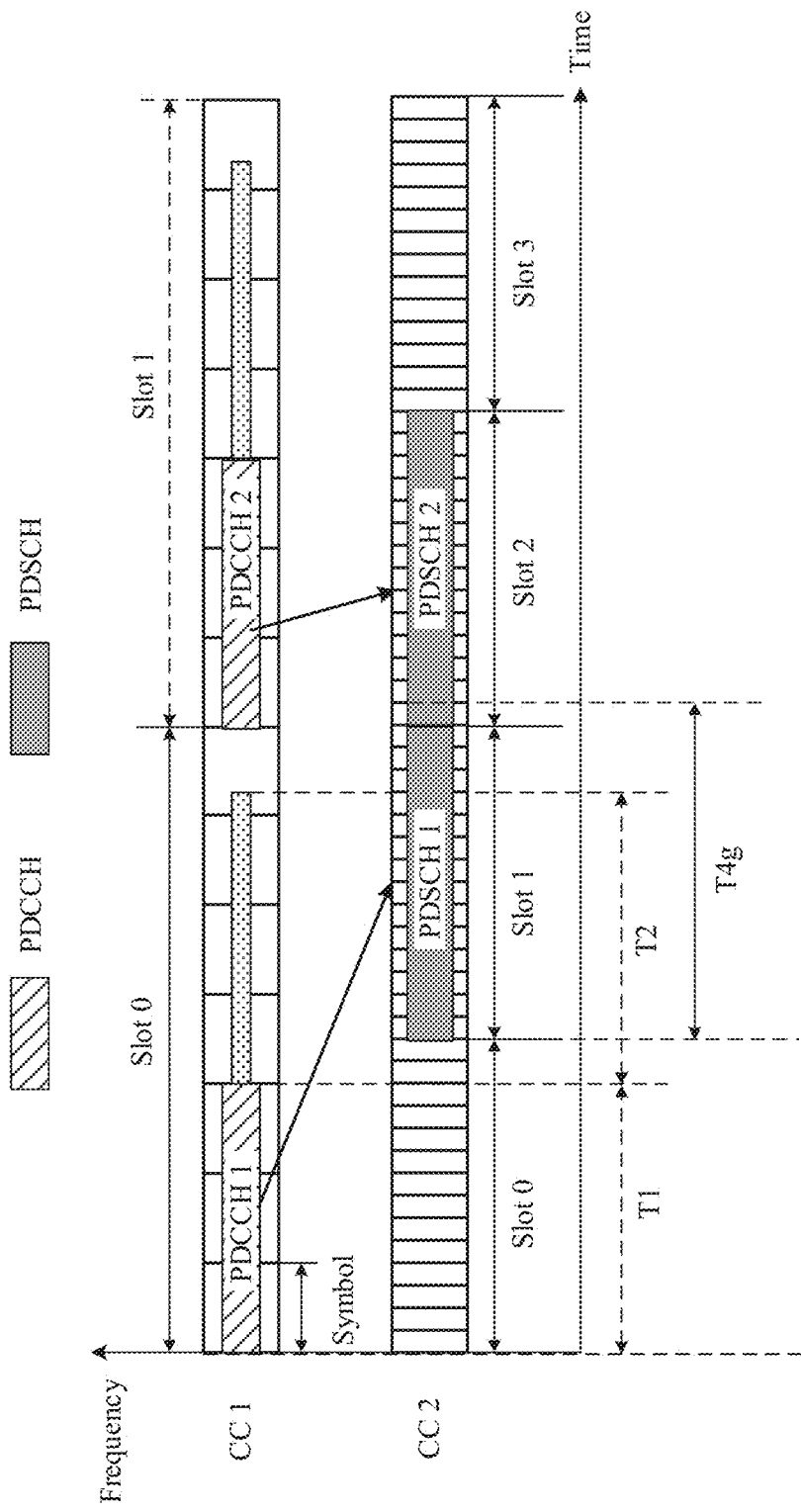
FIG. 13(a) and FIG. 13(b) are a schematic diagram of another case in which whether to limit a second time domain position is determined.
Figure 13B:
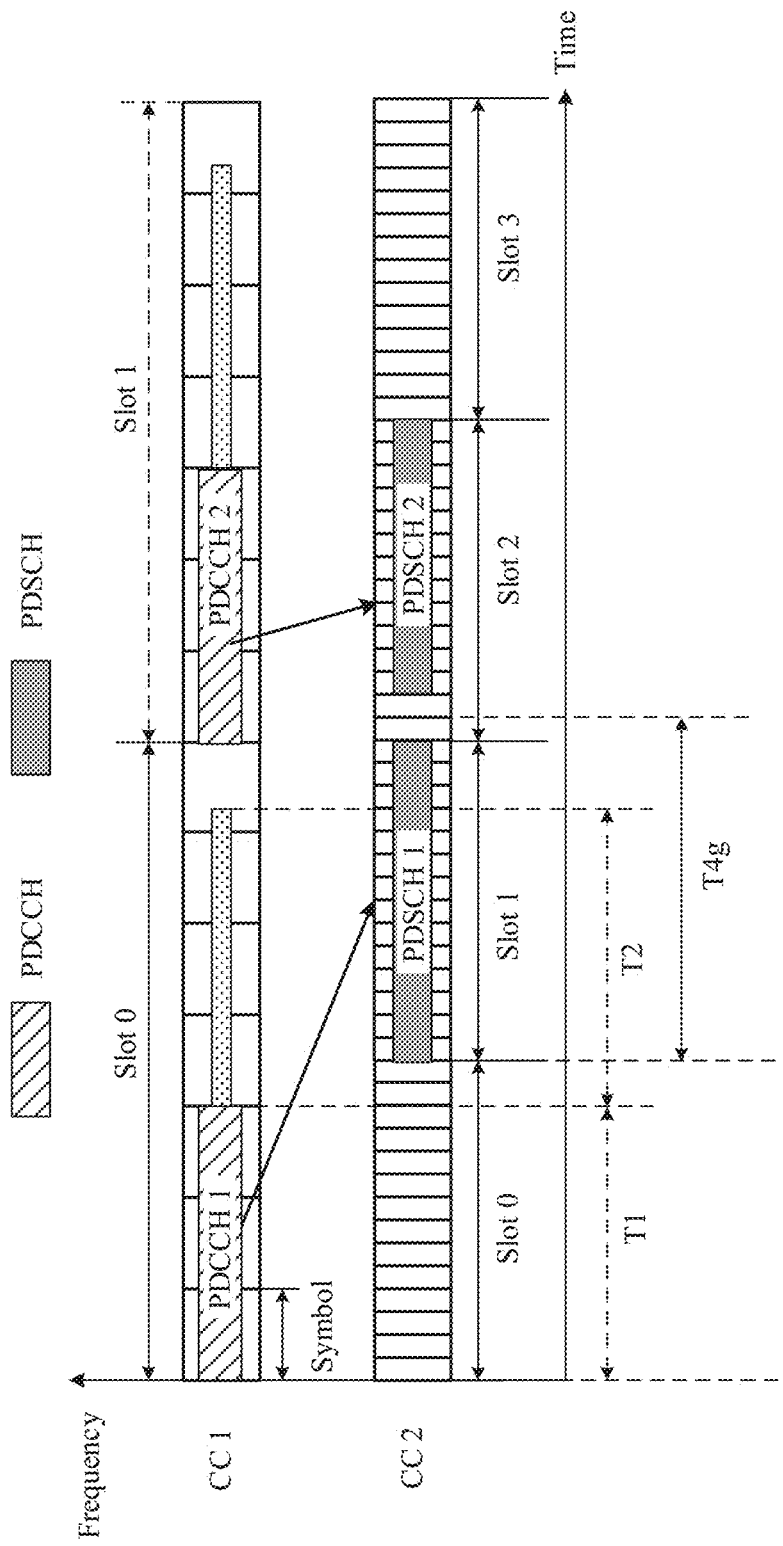

This embodiment of this application further provides a method for limiting the second time domain position (for ease of description, the method is referred to as a method b for short). In an example shown in FIG. 13, a PDSCH 1 scheduled by a PDCCH 1 and a PDSCH 2 scheduled by a PDCCH 2 are located in two consecutive slots (namely, a slot 1 and a slot 2). In this case, as shown in FIG. 13(a), the duration for storing the data before demodulation (PDSCH 1) by the terminal device is T4g. In other words, at an end point of T4g, the terminal device may release the buffer, and receive and store the PDSCH 2. However, because symbols occupied by the PDSCH 1 and the PDSCH 2 are consecutive, it can be learned from FIG. 13(a) and FIG. 13(b) that the terminal device cannot timely receive and store data in a first symbol in a slot 2. Based on this, in this embodiment of this application, when symbols occupied by data channels (for example, PDSCHs) in a plurality of slots of the scheduled carrier are consecutive, time domain positions of the PDSCHs need to be limited. A possible limitation manner is as follows: An interval between an end symbol, in a first slot, occupied by a first data channel and a start symbol, in a second slot, occupied by a second data channel is greater than or equal to duration for processing the stored first data channel and releasing a buffer by the terminal device. The first slot is a previous slot adjacent to the second slot. In other words, as shown in FIG. 13(b), an interval between an end symbol of a PDSCH 1 and a start symbol of a PDSCH 2 is greater than or equal to duration for processing the stored PDSCH 1 and releasing a buffer by the terminal device.

It should be noted that the method a and the method b described in this embodiment of this application may be separately applied, or may be applied in combination. In an example, whether the second time domain position needs to be limited may be first determined based on the capability of the terminal device. If the second time domain position needs to be limited, the second time domain position is determined based on the first time domain position. In this case, if it is determined that the second time domain position may be located in any slot after the slot 0 (referring to FIG. 8A), when the second time domain position is located in any slot after the slot 1, the case shown in FIG. 13(a) may occur. Therefore, the second time domain position may be further determined with reference to the method b.

It can be learned from the foregoing content that, when the network device schedules data by using the scheduling information, the scheduled data may be located at a plurality of possible time domain positions. However, when the scheduled data is located at some possible time domain positions, duration for buffering data by the terminal device is relatively long (which may exceed the buffer size of the terminal device), and then, the processing load of the terminal device is increased. Therefore, in this embodiment of this application, it is proposed that a time domain position of the scheduled data is determined based on the capability of the terminal device and/or the end position of the time domain position of the scheduling information, so that duration for storing data before demodulation (or to-be-sent data) by the terminal device by limiting the time domain position of the scheduled data is effectively shortened, thereby reducing the processing load of the terminal device.

The foregoing mainly describes the solutions provided in this application from a perspective of interaction between the network device and the terminal device. It may be understood that, to implement the foregoing functions, the network device or the terminal device may include corresponding hardware structures and/or software modules for performing the functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 14:
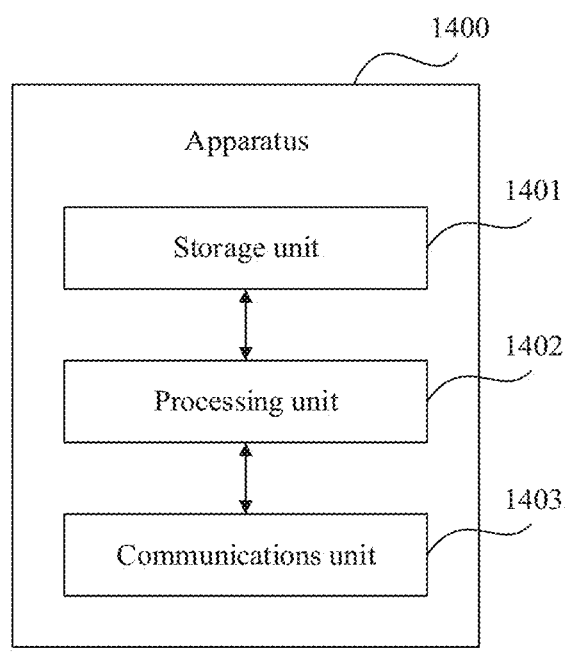
FIG. 14 is a schematic diagram of a structure of an apparatus according to an embodiment of this application.

When an integrated unit is used, FIG. 14 is a possible example block diagram of an apparatus according to an embodiment of this application. The apparatus 1400 may exist in a form of software. The apparatus 1400 may include a processing unit 1402 and a communications unit 1403. The processing unit 1402 is configured to control and manage an action of the apparatus 1400. The communications unit 1403 is configured to support the apparatus 1400 in communicating with another network entity. The apparatus 1400 may further include a storage unit 1401, configured to store program code and data that are of the apparatus 1400.

The processing unit 1402 may be a processor or a controller, for example, may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in the present disclosure. The processor may be a combination of processors implementing a computing function, for example, a combination including one or more microprocessors, or a combination of the DSP and a microprocessor. The communications unit 1403 may be a communications interface, a transceiver, a transceiver circuit, or the like, where the communications interface is a general name, and may include a plurality of interfaces during specific implementation. The storage unit 1401 may be a memory.

The apparatus 1400 may be the network device in any one of the foregoing embodiments, or may be a semiconductor chip disposed in the network device. The processing unit 1402 may support the apparatus 1400 in performing the actions of the network device in the foregoing method examples, and the communications unit 1403 may support communication between the apparatus 1400 and the terminal device. For example, the processing unit 1402 and/or the communications unit 1403 are/is configured to support the apparatus 1400 in performing a step 1401 and a step 1403 in FIG. 14.

Specifically, in an embodiment, the processing unit performs the following steps in combination with the communications unit: sending, at a first time domain position, scheduling information to a terminal device; and sending or receiving, at a second time domain position, data scheduled by using the scheduling information. The first time domain position and the second time domain position are located on different carriers, or the first time domain position and the second time domain position are located on different bandwidth parts BWPs. The second time domain position is determined based on an end position of the first time domain position and/or a capability of the terminal device.

In a possible implementation, the first time domain position and the second time domain position do not overlap on time domain resources.

In a possible implementation, the first time domain position is located in a first slot in the scheduling resource, and a last symbol, in the first slot, occupied by the first time domain position is located in a second slot in the scheduled resource; the second time domain position is located in any slot after the second slot in the scheduled resource; and the scheduling resource and the scheduled resource are located on the different carriers, or the scheduling resource and the scheduled resource are located on the different BWPs.

In a possible implementation, the first time domain position is located in a first slot in the scheduling resource, and a last symbol, in the first slot, occupied by the first time domain position is located in a second slot in the scheduled resource; the second time domain position is located in the second slot, and a symbol, in the second slot, occupied by the second time domain position is located after the last symbol, in the first slot, occupied by the first time domain position; and the scheduling resource and the scheduled resource are located on the different carriers, or the scheduling resource and the scheduled resource are located on the different BWPs.

In a possible implementation, a start symbol, in the second slot, occupied by the second time domain position is determined based on the last symbol, in the first slot, occupied by the first time domain position; and a quantity of symbols, in the second time domain unit, occupied by the second time domain position is determined based on a quantity of symbols included in the second time domain unit and the start symbol, in the second time domain unit, occupied by the second time domain position.

In a possible implementation, the capability of the terminal device includes any one or more of the following: a buffer size of the terminal device and a processing capability of the terminal device. The processing capability of the terminal device includes any one or more of the following: a capability of processing scheduling information and a capability of processing data.

In a possible implementation, the communications unit is further configured to receive the buffer size of the terminal device reported by the terminal device; or the processing unit is further configured to: obtain the processing capability of the terminal device; and determine the buffer size of the terminal device based on the processing capability of the terminal device.

In a possible implementation, duration of a data volume that can be stored in a buffer of the terminal device on the scheduled resource is less than duration from a start point of the first time domain position to a time point at which the terminal device completes channel estimation on the data channel.

The apparatus 1400 may be the terminal device in any one of the foregoing embodiments, or may be a semiconductor chip disposed in the terminal device. The processing unit 1402 may support the apparatus 1400 in performing the actions of the terminal device in the foregoing method examples, and the communications unit 1403 may support communication between the apparatus 1400 and the network device. For example, the processing unit 1402 and/or the communications unit 1403 are/is configured to support the apparatus 1400 in performing a step 1402 and the step 1403 in FIG. 14.

Specifically, in an embodiment, the processing unit performs the following steps in combination with the communications unit: receiving, at a first time domain position, scheduling information sent by a network device; and receiving or sending, at a second time domain position, data scheduled by using the scheduling information. The first time domain position and the second time domain position are located on different carriers, or the first time domain position and the second time domain position are located on different bandwidth parts BWPs. The second time domain position is determined based on an end position of the first domain position and/or a capability of the terminal device.

In a possible implementation, the first time domain position and the second time domain position do not overlap on time domain resources.

In a possible implementation, the first time domain position is located in a first slot in the scheduling resource, and a last symbol, in the first slot, occupied by the first time domain position is located in a second slot in the scheduled resource; the second time domain position is located in any slot after the second slot in the scheduled resource; and the scheduling resource and the scheduled resource are located on the different carriers, or the scheduling resource and the scheduled resource are located on the different BWPs.

In a possible implementation, the first time domain position is located in a first slot in the scheduling resource, and a last symbol, in the first slot, occupied by the first time domain position is located in a second slot in the scheduled resource; the second time domain position is located in the second slot, and a symbol, in the second slot, occupied by the second time domain position is located after the last symbol, in the first slot, occupied by the first time domain position; and the scheduling resource and the scheduled resource are located on the different carriers, or the scheduling resource and the scheduled resource are located on the different BWPs.

In a possible implementation, a start symbol, in the second slot, occupied by the second time domain position is determined based on the last symbol, in the first slot, occupied by the first time domain position; and a quantity of symbols, in the second time domain unit, occupied by the second time domain position is determined based on a quantity of symbols included in the second time domain unit and the start symbol, in the second time domain unit, occupied by the second time domain position.

In a possible implementation, the capability of the terminal device includes any one or more of the following: a buffer size of the terminal device and a processing capability of the terminal device. The processing capability of the terminal device includes any one or more of the following: a capability of processing scheduling information and a capability of processing data.

In a possible implementation, the communications unit is further configured to: report the buffer size of the terminal device and/or the processing capability of the terminal device to the network device.

In a possible implementation, duration of a data volume that can be stored in a buffer of the terminal device on the scheduled resource is less than duration from a start point of the first time domain position to a time point at which the terminal device completes channel estimation on the data channel.

Figure 15:
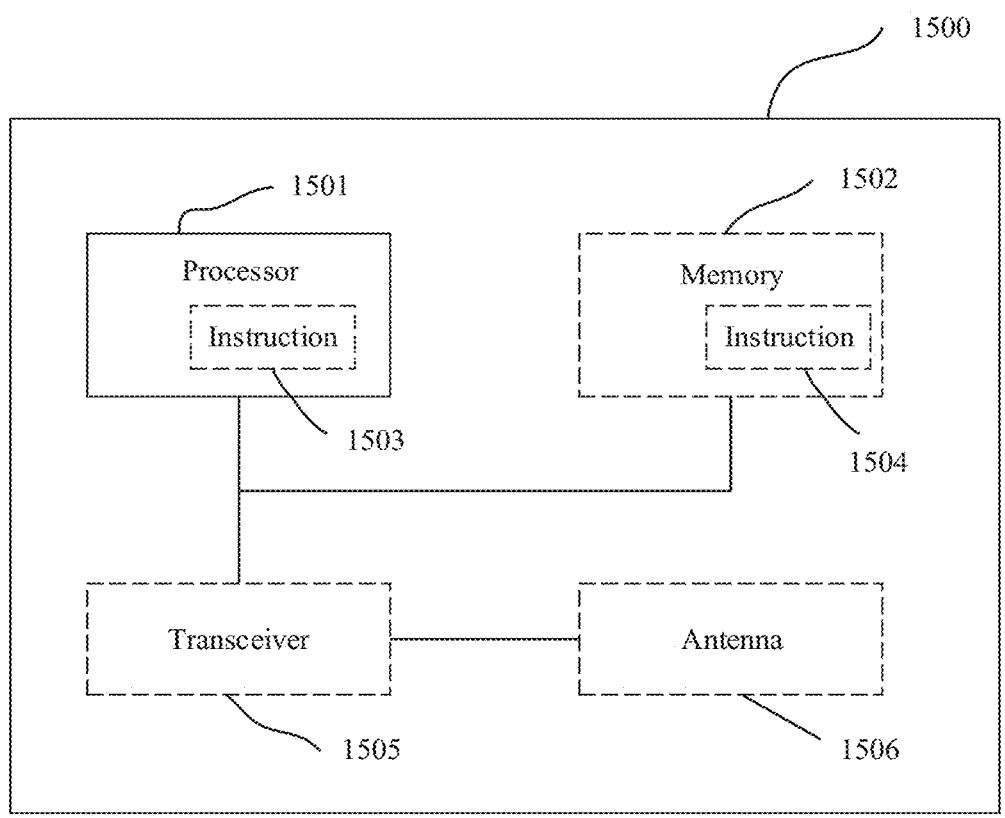
FIG. 15 is a schematic diagram of a structure of another apparatus according to an embodiment of this application.

FIG. 15 is a schematic diagram of a structure of a communications apparatus. The communications apparatus 1500 may be the network device 101 in FIG. 1, or may be the terminal device 1021, 1022, or 1023 in FIG. 1. The communications apparatus may be configured to implement the methods that correspond to the communications device and that are described in the foregoing method embodiments. For details, refer to the descriptions in the foregoing method embodiments.

The communications apparatus 1500 may include one or more processors 1501. The processor 1501 may also be referred to as a processing unit, and may implement a specific control function. The processor 1501 may be a general-purpose processor, a dedicated processor, or the like. For example, the processor 1501 may be a baseband processor or a central processing unit. The baseband processor may be configured to process a communication protocol and communication data. The central processing unit may be configured to control the communications apparatus (for example, a base station, a baseband chip, a distributed unit (DU), or a centralized unit (CU)), execute a software program, and process data of the software program.

In an optional design, the processor 1501 may also store an instruction and/or data 1503. The instruction and/or data 1503 may be run by the processor, so that the communications apparatus 1500 performs the methods that correspond to the communications device and that are described in the foregoing method embodiments.

In another optional design, the processor 1501 may include a transceiver unit configured to implement a receiving function and a sending function. For example, the transceiver unit may be a transceiver circuit or an interface. A circuit or an interface configured to implement the receiving function and a circuit or an interface configured to implement the sending function may be separated or may be integrated together.

In another possible design, the communications apparatus 1500 may include a circuit, and the circuit may implement a transmitting, receiving, or communication function in the foregoing method embodiments.

Optionally, the communications apparatus 1500 may include one or more memories 1502. The memory may store an instruction 1504, and the instruction may be run on the processor, so that the communications apparatus 1500 performs the methods described in the foregoing method embodiments. Optionally, the memory may further store data. Optionally, the processor may also store an instruction and/or data. The processor and the memory may be separately disposed, or may be integrated together. For example, various correspondences described in the foregoing method embodiments may be stored in the memory, or may be stored in the processor.

Optionally, the communications apparatus 1500 may further include a transceiver 1505 and/or an antenna 1506. The processor 1501 may be referred to as a processing unit, and controls the communications apparatus (a terminal device or a network device). The transceiver 1505 may be referred to as a transceiver unit, a transceiver machine, a transceiver circuit, a transceiver, or the like, and is configured to implement receiving and sending functions of the communications apparatus.

In a possible design, a communications apparatus 1500 (for example, an integrated circuit, a wireless device, a circuit module, a network device, or a terminal) may include a processor 1501 and a transceiver 1505. The transceiver 1505 sends, at a first time domain position, scheduling information, and sends or receives, at a second time domain position, data scheduled by using the scheduling information. The processor 1501 determines the second time domain position based on an end position of the first time domain position and/or a capability of the terminal device.

The processor and the transceiver described in this application may be implemented on an integrated circuit (IC), an analog IC, a radio frequency integrated circuit RFIC, a hybrid signal IC, an application-specific integrated circuit (application specific integrated circuit, ASIC), a printed circuit board (PCB), an electronic device, or the like. The processor and the transceiver may alternatively be manufactured by using various IC process technologies, for example, a complementary metal oxide semiconductor (CMOS), an N-type metal oxide semiconductor (nMetal-oxide-semiconductor, NMOS), a P-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

In the descriptions of the foregoing embodiments, the communications apparatus is described by using the network device or the terminal device as an example. However, a scope of the communications apparatus described in this application is not limited to the example, and the structure of the communications apparatus may not be limited by FIG. 15. The communications apparatus may be an independent device or may be a part of a relatively large device. For example, the device may be:

(1) an independent integrated circuit (IC), a chip, a chip system, or a subsystem;
(2) a set including one or more ICs, where optionally, the IC set may further include a storage component configured to store data and/or an instruction;
(3) an ASIC, for example, a modem (MSM);
(4) a module that can be embedded in another device;
(5) a receiver, a terminal, an intelligent terminal, a cellular phone, a wireless device, a handheld phone, a mobile unit, a vehicle-mounted device, a network device, a cloud device, an artificial intelligence device, or the like; or
(6) another device.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk (SSD)), or the like.

The various illustrative logical units and circuits described in the embodiments of the present disclosure may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general processor may be a microprocessor. Optionally, the general processor may also be any traditional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. Exemplarily, the storage medium may connect to a processor so that the processor may read information from the storage medium and write information to the storage medium. Alternatively, the storage medium may further be integrated into a processor. The processor and the storage medium may be arranged in an ASIC, and the ASIC may be arranged in terminal device. Alternatively, the processor and the storage medium may also be arranged in different components of the terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, obviously, various modifications and combinations may be made to them without departing from the scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method performed by an apparatus, the method comprising:
   sending, at a first time domain position on a first carrier, scheduling information to a terminal device, to schedule communication of data with the terminal device using the scheduling information; and
   communicating, at a second time domain position on a second carrier, the data scheduled using the scheduling information with the terminal device, wherein the second carrier is different from the first carrier;
   wherein the second time domain position is determined based on an end position of the first time domain position or a capability of the terminal device, and the first time domain position and the second time domain position do not overlap on time domain resources; and
   wherein the first time domain position is located in a first slot on the first carrier, and a last symbol occupied by the first time domain position in the first slot overlaps a second slot on the second carrier, the second time domain position is located in the second slot, and a symbol, in the second slot, occupied by the second time domain position is located after the last symbol occupied by the first time domain position in the first slot.

2. The method according to claim 1, wherein
   a start symbol occupied by the second time domain position in the second slot is determined based on the last symbol occupied by the first time domain position in the first slot; and a quantity of symbols, in accordance with a second time domain unit of a scheduled resource, occupied by the second time domain position is determined based on a quantity of symbols comprised in the second time domain unit and the start symbol occupied by the second time domain position in accordance with the second time domain unit.

3. A method performed by an apparatus, the method comprising:
   receiving, at a first time domain position on a first carrier, scheduling information from a network device, the scheduling information scheduling communication of data with the network device; and
   communicating, at a second time domain position on a second carrier, the data scheduled using the scheduling information with the network device, wherein the second carrier is different from the first carrier;
   wherein the second time domain position is determined based on an end position of the first time domain position or a capability of the apparatus, and the first time domain position and the second time domain position do not overlap on time domain resources; and
   wherein the first time domain position is located in a first slot on the first carrier, and a last symbol occupied by the first time domain position in the first slot overlaps a second slot on the second carrier, the second time domain position is located in the second slot, and a symbol, in the second slot, occupied by the second time domain position is located after the last symbol occupied by the first time domain position in the first slot.

4. The method according to claim 3, wherein
   a start symbol occupied by the second time domain position in the second slot is determined based on the last symbol occupied by the first time domain position in the first slot; and a quantity of symbols, in accordance with a second time domain unit, occupied by the second time domain position is determined based on a quantity of symbols comprised in the second time domain unit and the start symbol occupied by the second time domain position in accordance with the second time domain unit.

5. An apparatus, comprising:
   at least one processor and an interface circuit, wherein the at least one processor is configured to control the interface circuit to:
   send, at a first time domain position on a first carrier, scheduling information to a terminal device to schedule communication of data with the terminal device using the scheduling information; and
   communicate, at a second time domain position on a second carrier, the data scheduled using the scheduling information with the terminal device, wherein the second carrier is different from the first carrier;
   wherein the second time domain position is determined based on an end position of the first time domain position or a capability of the terminal device, and the first time domain position and the second time domain position do not overlap on time domain resources; and
   wherein the first time domain position is located in a first slot on the first carrier, and a last symbol occupied by the first time domain position in the first slot overlaps a second slot on the second carrier; the second time domain position is located in the second slot, and a symbol, in the second slot, occupied by the second time domain position is located after the last symbol occupied by the first time domain position in the first slot.

6. The apparatus according to claim 5, wherein
   a start symbol occupied by the second time domain position in the second slot is determined based on the last symbol occupied by the first time domain position in the first slot; and a quantity of symbols, in accordance with a second time domain unit of a scheduled resource, occupied by the second time domain position is determined based on a quantity of symbols comprised in the second time domain unit and the start symbol occupied by the second time domain position in accordance with the second time domain unit.

7. An apparatus comprising:
   at least one processor and an interface circuit, wherein the at least one processor is configured to control the interface circuit to:
   receive, at a first time domain position on a first carrier, scheduling information from a network device, the scheduling information scheduling communication of data with the network device; and
   communicate, at a second time domain position on a second carrier, the data scheduled using the scheduling information with the network device, wherein the second carrier is different from the first carrier;
   wherein the second time domain position is determined based on an end position of the first time domain position or a capability of the apparatus, and the first time domain position and the second time domain position do not overlap on time domain resources; and
   wherein the first time domain position is located in a first slot on the first carrier, and a last symbol occupied by the first time domain position in the first slot overlaps a second slot on the second carrier, the second time domain position is located in the second slot, and a symbol, in the second slot, occupied by the second time domain position is located after the last symbol occupied by the first time domain position in the first slot.

8. The apparatus according to claim 7, wherein
a start symbol occupied by the second time domain position in the second slot is determined based on the last symbol occupied by the first time domain position in the first slot; and a quantity of symbols, in accordance with a second time domain unit, occupied by the second time domain position is determined based on a quantity of symbols comprised in the second time domain unit and the start symbol occupied by the second time domain position in accordance with the second time domain unit.

9. The apparatus according to claim 5, wherein the capability of the terminal device comprises a processing capability of the terminal device.

10. The apparatus according to claim 5, wherein the capability of the terminal device comprises a buffer size of the terminal device.

11. The apparatus according to claim 7, wherein the capability of the apparatus comprises a processing capability of the apparatus.

12. The apparatus according to claim 7, wherein the capability of the apparatus comprises a buffer size of the apparatus.

* * * * *